(12) United States Patent
Gaines

(10) Patent No.: US 10,753,523 B2
(45) Date of Patent: Aug. 25, 2020

(54) PIPE JOINT FITTING WITH EARTHQUAKE RESISTANT FUNCTIONS

(71) Applicant: American Cast Iron Pipe Company, Birmingham, AL (US)

(72) Inventor: Scott R. Gaines, Pinson, AL (US)

(73) Assignee: AMERICAN CAST IRON PIPE COMPANY, Birmingham, AL (US)

( * ) Notice: Subject to any disclaimer, the term of this patent is extended or adjusted under 35 U.S.C. 154(b) by 0 days.

(21) Appl. No.: 16/122,852

(22) Filed: Sep. 5, 2018

(65) Prior Publication Data

US 2019/0003627 A1    Jan. 3, 2019

Related U.S. Application Data

(62) Division of application No. 15/162,274, filed on May 23, 2016, now Pat. No. 10,436,367.

(60) Provisional application No. 62/164,973, filed on May 21, 2015.

(51) Int. Cl.
    *F16L 37/092*    (2006.01)
    *F16L 55/02*     (2006.01)
    *F16L 57/00*     (2006.01)

(52) U.S. Cl.
    CPC ............ *F16L 37/092* (2013.01); *F16L 55/02* (2013.01); *F16L 57/00* (2013.01)

(58) Field of Classification Search
    CPC . F16L 21/03; F16L 21/02; F16L 21/00; F16L 17/02; F16L 17/06; F16L 27/08; F16L 27/0804; F16L 27/0861; F16L 27/12; F16L 27/127; F16L 27/0808; F16L 27/0816; F16L 37/50; F16L 37/505

USPC ..... 285/110, 108, 98, 95, 31, 298, 302, 374, 285/145.4, 145.2, 230, 231, 233

See application file for complete search history.

(56) References Cited

U.S. PATENT DOCUMENTS

| | | | |
|---|---|---|---|
| 1,255,577 A | 2/1918 | Berry | |
| 2,693,378 A * | 11/1954 | Beyer | F16L 37/092 285/5 |
| 4,296,953 A * | 10/1981 | Nagao | F16L 21/08 285/302 |
| 4,428,604 A | 1/1984 | Conner | |
| 4,456,288 A | 6/1984 | Conner | |
| 4,524,505 A | 6/1985 | Conner | |
| 4,643,466 A | 2/1987 | Conner et al. | |
| 4,685,708 A | 8/1987 | Conner | |
| 4,776,617 A * | 10/1988 | Sato | F16L 27/047 285/145.3 |
| 5,067,751 A | 11/1991 | Walworth et al. | |
| 5,197,768 A | 3/1993 | Conner | |
| 5,220,419 A | 6/1993 | Sklar et al. | |
| 5,609,368 A | 3/1997 | Maki et al. | |
| 6,237,965 B1 * | 5/2001 | Kuo | F16L 27/026 285/111 |
| 6,305,426 B1 * | 10/2001 | Sato | F16L 27/12 138/120 |
| 7,243,954 B2 | 7/2007 | Toshima et al. | |

(Continued)

OTHER PUBLICATIONS

Non Final Office Action in corresponding U.S. Appl. No. 15/162,274 dated Sep. 13, 2018.

*Primary Examiner* — Aaron M Dunwoody
(74) *Attorney, Agent, or Firm* — Miles & Stockbridge P.C.; David R. Schaffer

(57) ABSTRACT

Pipe joints and more particularly cylindrical push-on type pipe joint fittings with earthquake resistant functions.

11 Claims, 15 Drawing Sheets

(56) References Cited

U.S. PATENT DOCUMENTS 8,764,066 B1* 7/2014 Rice ................. F16L 37/091
 285/15
2011/0278835 A1* 11/2011 Kishi ................ F16L 27/12751
 285/18

* cited by examiner

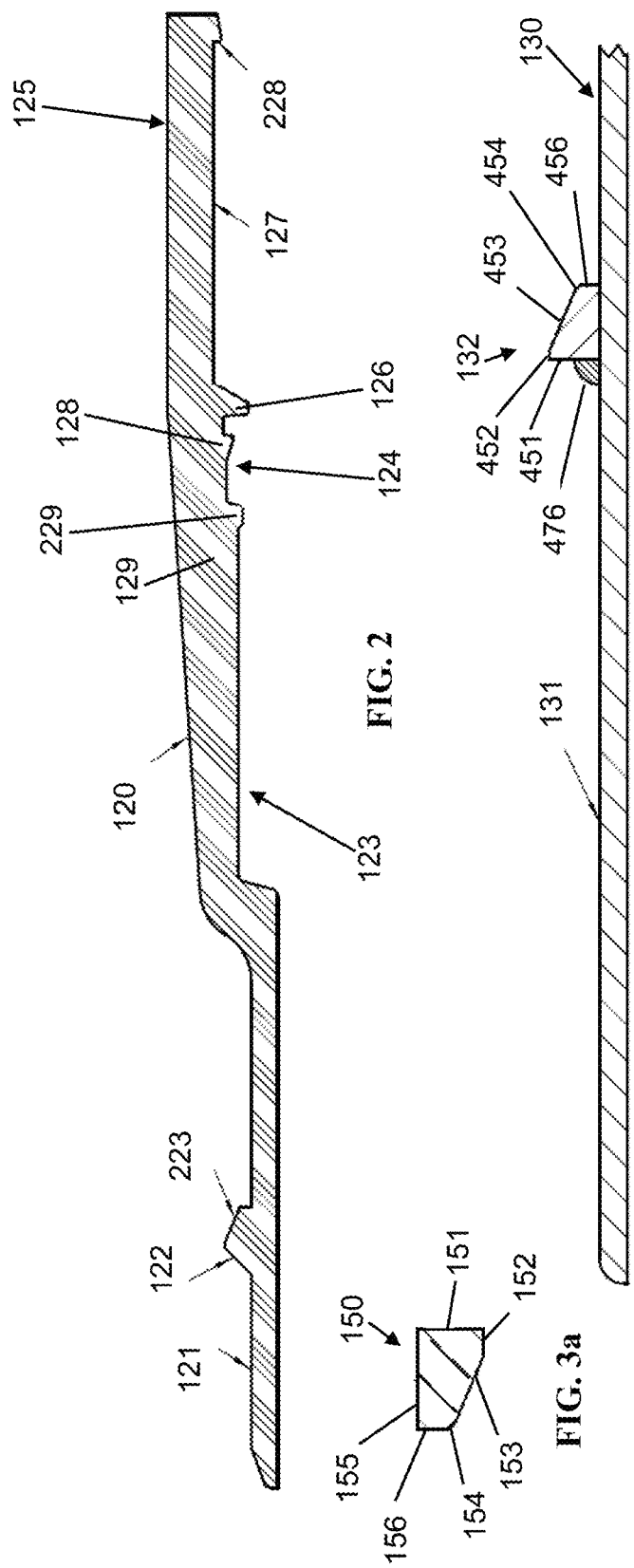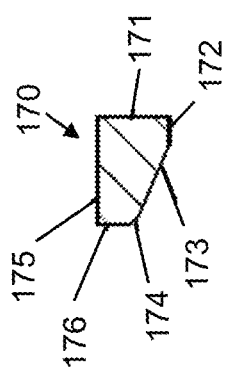

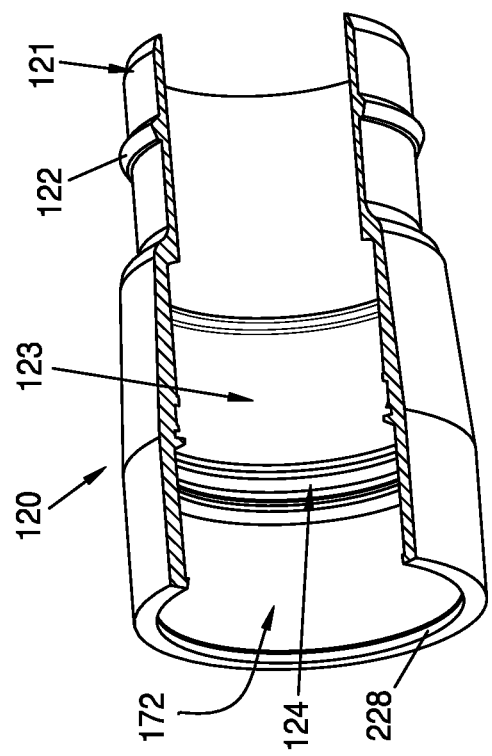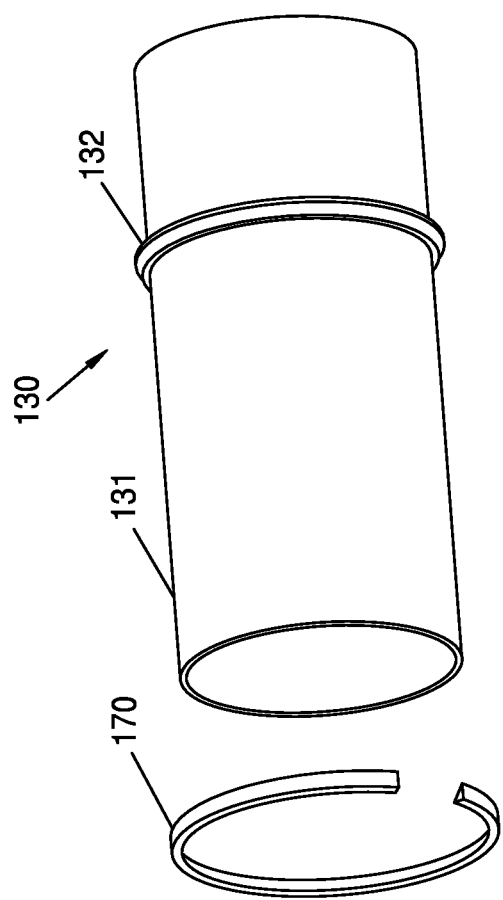
FIG. 8

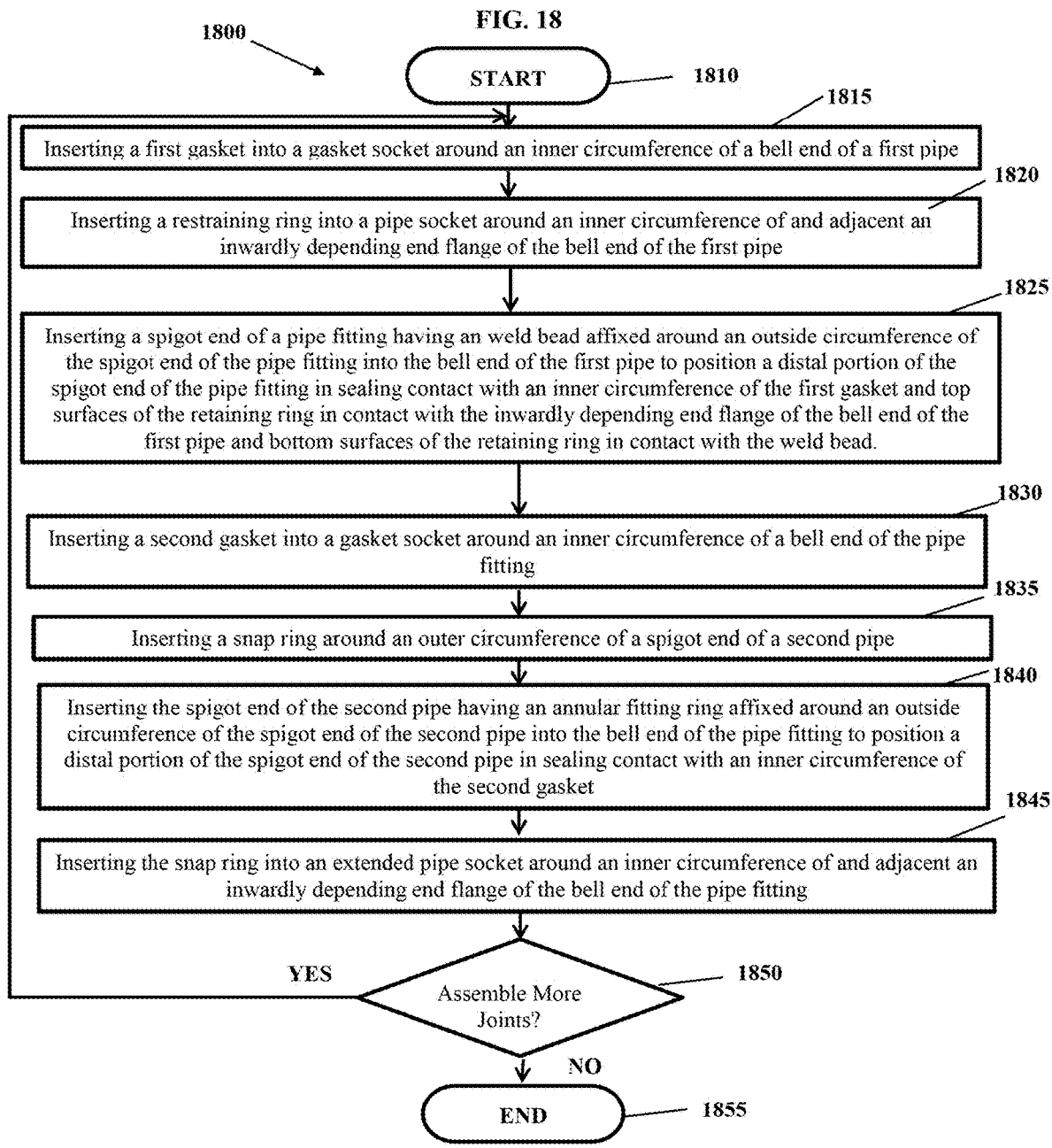

PIPE JOINT FITTING WITH EARTHQUAKE RESISTANT FUNCTIONS

CROSS-REFERENCE TO RELATED APPLICATIONS

This application is a division of application Ser. No. 15/162,274 filed May 23, 2016, which claims the benefit of and priority to U.S. Provisional Application No. 62/164,973, filed on May 21, 2015, all of which are incorporated herein by reference in their entireties.

TECHNICAL AREA

Pipe joints and more particularly cylindrical push-on type pipe joint fittings with earthquake resistant functions.

SUMMARY

Standard pipe joints are not designed to allow a combination of expansion, contraction, and deflection sufficient to resist the effects of a seismic event. During earthquakes, settlement or landslides, water service to an affected area could be interrupted due to pipelines being damaged or destroyed. Embodiments of the disclosed subject matter include a push-on fitting designed to provide expansion and contraction, deflection and restraint against axial separation sufficient to resist the effects of a seismic event.

Specifically, one or more embodiments of an earthquake resistant pipe joint assembly include a substantially cylindrical pipe fitting with a spigot end disposed in a first pipe bell end with a first gasket and a first snap ring installed therein, and a bell end of the pipe fitting with a second gasket and a second snap ring installed therein and disposed around a second pipe spigot end, but is not necessarily limited to the materials shown there. The purpose of the pipe fitting is to maintain a seal between the first pipe and the pipe fitting and the pipe fitting and the second pipe while allowing for expansion, contraction, and deflection sufficient to resist the effects of a seismic event.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

FIG. 2 is a cross-sectional, exploded view of the earthquake resistant push-on type pipe joint fitting of FIG. 1, in accordance with an embodiment of the disclosed subject matter.

FIG. 3a is a cross-sectional view of a snap ring that fits into a bell end of the earthquake resistant push-on type pipe joint fitting of FIGS. 1 and 2, in accordance with an embodiment of the disclosed subject matter.

FIG. 3b is a cross-sectional view of a snap ring that fits into a bell end of the fitting pipe of the earthquake resistant push-on type pipe joint fitting of FIGS. 1 and 2, in accordance with an embodiment of the disclosed subject matter.

FIG. 4 is a partial longitudinal, cross-sectional view of a spigot end of the second pipe of FIG. 1 with a first annular restraint component fixedly attached around an outer circumference of the spigot end of the second pipe, in accordance with an embodiment of the disclosed subject matter.

FIG. 8 is an exploded, partial cross-sectional side view of a portion of a bell and spigot pipe joint with a spigot end of a pipe separated from a bell end of a push-on type pipe joint fitting including an annular snap ring around the spigot end of the pipe of the earthquake resistant push-on type pipe joint fitting of FIG. 1, in accordance with an embodiment of the disclosed subject matter.

FIG. 18 is a flow chart of a method of assembling a bell and spigot pipe joint with the spigot end of the earthquake resistant push-on type pipe joint fitting inserted into a bell end of a second pipe and the bell end of the earthquake resistant push-on type pipe joint fitting inserted around a spigot end of the first pipe of FIG. 9 and the pipe joint including an annular snap ring, an annular iron segment and rubber dual-component, gasket and an annular rubber gaskets, in accordance with the another embodiment of the disclosed subject matter.

DETAILED DESCRIPTION

Figure 1:
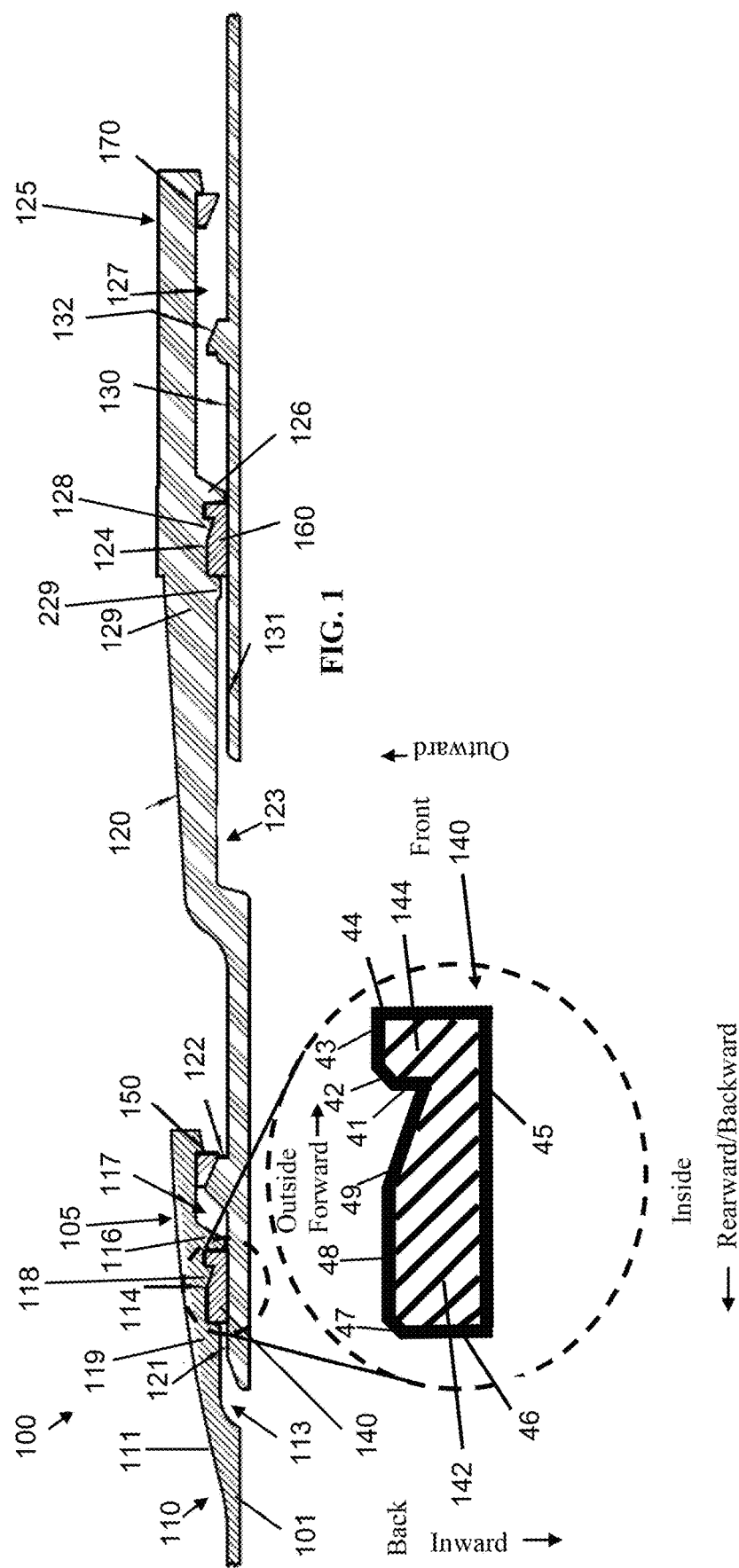
FIG. 1 is a partial longitudinal, cross-sectional view of a bell and spigot pipe joint with the spigot end of an earthquake resistant push-on type pipe joint fitting inserted into a bell end of a first pipe and the bell end of the push-on type pipe joint fitting inserted around a spigot end of a second pipe and the pipe joint including annular snap rings and annular gaskets, in accordance with an embodiment of the disclosed subject matter.

In general, one or more embodiments of the disclosed subject matter include (i.e., comprise) an earthquake resistant pipe joint assembly that includes a first pipe including a first pipe bell end with an interiorly extending axial flange formed around an inner surface of an end of the first pipe bell end, the interiorly extending flange having a substantially square outer edge and a substantially square inner edge and a flange end surface tapering outwardly from the inner edge to the outer edge with a first pipe inner flange wall extending outwardly from the inner edge and toward and connecting with a first side of a first pipe socket/groove formed in and extending around the inner surface and adjacent to the flange, a second side of the first pipe socket/groove extending inwardly from a bottom of the first pipe socket/groove to a front angled corner of a radial protrusion, a flat inner surface of the radial protrusion extends axially rearwardly away from the front angled corner of a first pipe radial protrusion toward a back edge of the first pipe radial protrusion and a back wall extends substantially perpendicularly outwardly from the back edge to a front corner of a first pipe gasket socket. The first pipe socket/groove is configured to receive and hold a first snap ring, and the first pipe gasket socket is reciprocally configured to receive and hold an outer circumference of a first annular rubber gasket.

For the sake of clarity and consistency in the following description, FIGS. 1, 10 and 13 have been labeled to illustrate the descriptive positional terms associated with the restraining ring, especially when it is installed inside a pipe. Specifically, a "front" or "front side" is shown on the right of a gasket 140, an "outside" is shown above the gasket 140, a "back" or "back side" is shown to the left of the gasket 140, and an "inside" is shown below the gasket 140 of FIG. 1 and similar markings are shown in relation to a restraining ring 950 in FIGS. 10 and 13. In addition, directional movement and/or orientation will be described using "inward" to describe radial movement and/or orientation running from the outside to the inside, that is from the outside diameter toward a longitudinal axis of the restraining ring 950 as well as individual elements of the pipe joint; "outward" to describe movement and/or orientation running from the inside to the outside, that is from the longitudinal axis toward the outside diameter of the restraining ring 950 as well as individual elements of the pipe joint; "forward" to describe longitudinal movement and/or orientation running from the back to the front; "backward/rearward" to describe longitudinal movement and/or orientation running from the front to the back.

The one or more embodiments of the pipe joint also includes a pipe fitting including a pipe fitting bell end with an interiorly extending axial flange formed around an inner surface of an end of the pipe fitting bell end, the interiorly extending flange having a substantially square outer edge and a substantially square inner edge and a flange end surface tapering outwardly from the inner edge to the outer edge with a pipe fitting inner flange wall extending outwardly from the inner edge and toward and connecting with a first side of a pipe fitting socket/groove formed in and extending around the inner surface and adjacent to the flange, a second side of the pipe fitting socket/groove extending inwardly from a bottom of the pipe fitting socket/groove to an front angled corner of a radial protrusion, a flat inner surface of the radial protrusion extends axially rearwardly away from the front angled corner of a pipe fitting radial protrusion toward a back edge of the pipe fitting radial protrusion and a back wall extends substantially perpendicularly outwardly from the back edge to a front corner of a pipe fitting gasket socket, the pipe fitting also including a pipe fitting spigot end with an annular pipe fitting ring affixed to and extending around an outer circumference of the pipe fitting spigot end. The pipe fitting socket/groove is configured to receive and hold a second snap ring, and the pipe fitting gasket socket is reciprocally configured to receive and hold an outer circumference of a second annular rubber gasket.

The one or more embodiments of the pipe joint further includes a second pipe including a second pipe spigot end with an annular second pipe ring affixed to and extending around an outer circumference of the second pipe spigot end. The pipe joint still further includes the pipe fitting spigot end being positioned in the first pipe bell end so a pipe fitting spigot end outer circumference section is in sealing contact with an inner circumference of the first gasket and a first snap ring wedging surface being in sealing contact with a pipe fitting ring wedging surface, and the second pipe spigot end being positioned in the pipe fitting bell end so a second pipe spigot end outer circumference section is in sealing contact with an inner circumference of the second gasket.

FIG. 1 is a partial longitudinal, cross-sectional view of a bell and spigot pipe joint 100 with a spigot end 121 of an earthquake resistant push-on type pipe joint fitting 120, which can also be referred to as a central earthquake casting, inserted into a bell end 105 of a first pipe 110 with an outer surface 111 and a bell end 125 of the push-on type pipe joint fitting 120 inserted around a spigot end 131 of a second pipe 130 and the pipe joint including a first annular snap ring 150, a second annular snap ring 170, a first annular gasket 140 and a second annular gasket 160, in accordance with an embodiment of the disclosed subject matter. While the following description is of the earthquake resistant push-on type pipe joint fitting 100 cross-section in FIG. 1, which is generally related to pipes with smaller diameters, for example, 4"-12", it is understood that the entire earthquake resistant push-on type pipe joint fitting 100 is a continuous, cylindrical fitting that can be made in a variety of different diameters to fit the various pipe diameters in which it is designed to be used. The annular snap rings 150, 170 are made of a hardened metal, for example, but not limited to, a ductile iron and/or other galvanic corrosion-limiting materials. In addition, in the one or more embodiments, the annular gaskets 140, 160 can be made of a "soft" rubber such as defined in the American Water Works Association Standard ANSI/AWWA C111/A21.11 and having a Shore "A" durometer hardness of about 50 to 70, but is not necessarily limited to the materials shown there. For example, in another embodiment, the annular gaskets can be made of both a "soft" rubber sealing portion 142 having a Shore "A" durometer hardness of around 65+/−5 and a hard rubber hook portion 144 having a Shore "A" durometer hardness of around 85+/−5, see, for example, the close-up view of the gasket 140 in FIG. 1.

In FIG. 1, the first pipe bell end 105 is assembled onto the spigot end 131 of the earthquake resistant push-on type pipe joint fitting 120 using the first gasket 140 for sealing purposes. The first snap ring 150 is installed into a first pipe front groove 117 of the first pipe bell end to mate with a pipe fitting ring 122, which is located on an outside diameter (i.e., around an outer circumference) of the fitting pipe spigot 121 on the spigot end of the earthquake resistant push-on type pipe joint fitting 120 and prevent joint disengagement. In this embodiment, the pipe fitting ring 122 (also referred to as a Flex-Ring® pipe spigot, Flex-Ring® is a registered trademark of the Applicant) is machined from, not welded to the fitting pipe spigot end 121. At a socket/bell end of the pipe fitting 125 the spigot end 131 of the second pipe 130 is inserted into the bell end 125 of the pipe fitting using the second gasket 160 installed in a fitting pipe gasket socket 124 for sealing purposes and the second snap ring 170 is installed in a front groove 127 of the pipe fitting socket to mate with a second pipe spigot ring 132 that is fixedly attached, e.g., but not limited to, being welded to the outside diameter (i.e., around an outer circumference) of the second pipe spigot 130. The front groove 127 has an extended socket depth allowing the specially placed second pipe spigot ring 132, an expansive range of motion. Specifically, the design enables a minimum total longitudinal extension of about 4.8", or about 2.4" longitudinal extension in each direction measured from the mid-point of the extended socket/groove, which meets the requirement for class S-1 for earthquake resistant ductile iron pipe (ERDIP) per ISO 16134 Ductile Iron Pipe for Earthquake and Subsidence-Resistant Design. In addition, the total assembly permits a total of up to 8 degrees of deflection, with 5 degrees of deflection coming from the conventional Flex-Ring® pipe joint formed by the spigot end 121 of the earthquake resistant push-on type pipe joint fitting 120 and bell end 105 of the first pipe 110, and 3 degrees of deflection coming from the spigot end 131 of the second pipe 130 and the socket end of the earthquake resistant push-on type pipe joint fitting 120.

Also in FIG. 1, a close-up view showing details of a possible compressed view of the first gasket 140, which is the same as the second gasket 160, is shown in the enlarged, circular window. Specifically, as with the gaskets 940, 960 of FIG. 9 below, the gaskets 140, 160 of FIG. 1 can be a Fastite Gasket that is manufactured by the Applicant, American Cast Iron Pipe Company of Birmingham, Ala. Examples of the uncompressed state of the gasket 140, 160, 940, 960 are shown in FIGS. 13 and 14 prior to installation in a joint. The compressed first gasket 140 has the front or hook portion 144 connected to the back or sealing portion 142. The first gasket 140 has a shape that reciprocally fits into and is held by a first pipe gasket socket 114 that is formed in and around an inner circumference of the bell end 105 of the first pipe 110. The first pipe gasket socket 114 has a radially and inwardly protruding front ridge 116 with an inwardly and rearwardly extending front wall connected at a top edge to a front edge of a flat inner wall portion that at a back edge is in turn connected to top edge of a perpendicularly and outwardly extending back wall. A bottom edge of the perpendicularly and outwardly extending back wall connects to a front edge of a rearwardly extending inner wall of a front groove in the first pipe gasket socket 114. A back edge of the rearwardly extending inner wall connects to a top edge of a front wall of an annular angled middle ridge 118. The front wall extends substantially perpendicularly and inwardly away from the rearwardly extending inner wall and a bottom edge of the front wall of the annular angled middle ridge 118 connects to a bottom edge of an outwardly and rearwardly extending angled back wall of the annular angled middle ridge 118. A top edge of the outwardly and rearwardly extending angled back wall of the annular angled middle ridge 118 connects to a front edge of a rearwardly extending inner wall of a back groove in the first pipe gasket socket 114. A back edge of the rearwardly extending inner wall of the back groove in the first pipe gasket socket 114 connects to a top edge of an inwardly and perpendicularly extending back wall of the back groove in the first pipe gasket socket 114. A bottom edge of the inwardly and perpendicularly extending back wall of the back groove connects to a front edge of a rearwardly and substantially perpendicularly extending inner wall of a back portion 119 of the bell end 105. A back edge portion of the rearwardly and substantially perpendicularly extending inner wall of the back portion 119 curves inwardly to and connects with a front edge of an inner wall 101 of the first pipe 110.

The second gasket 160 has a shape that reciprocally fits into and is held by a pipe joint fitting gasket socket 124 that is formed in and around an inner circumference of the bell end 125 of the pipe joint fitting 120. The pipe joint fitting gasket socket 124 has a radially and inwardly protruding front ridge 126 with an inwardly and rearwardly extending front wall connected at a top edge to a front edge of a flat inner wall portion that at a back edge is in turn connected to top edge of a perpendicularly and outwardly extending back wall. A bottom edge of the perpendicularly and outwardly extending back wall connects to a front edge of a rearwardly extending inner wall of a front groove in the pipe joint fitting gasket socket 124. A back edge of the rearwardly extending inner wall connects to a top edge of a front wall of an annular angled middle ridge 128. The front wall extends substantially perpendicularly and inwardly away from the rearwardly extending inner wall and a bottom edge of the front wall of the annular angled middle ridge 128 connects to a bottom edge of an outwardly and rearwardly extending angled back wall of the annular angled middle ridge 128. A top edge of the outwardly and rearwardly extending angled back wall of the annular angled middle ridge 128 connects to a front edge of a rearwardly extending inner wall of a back groove in the pipe joint fitting gasket socket 124. A back edge of the rearwardly extending inner wall of the back groove in the pipe joint fitting gasket socket 124 connects to a top edge of an inwardly and perpendicularly extending back wall of the back groove in the pipe joint fitting gasket socket 124. A bottom edge of the inwardly and perpendicularly extending back wall of the back groove connects to a front edge of a rearwardly and substantially perpendicularly extending inner wall of a second, low radially and inwardly protruding low ridge 229 that, at a back edge slopes outwardly toward and connects to a front edge of a rearwardly extending back portion 129 of the bell end 125. A back edge portion of the rearwardly and substantially perpendicularly extending inner wall of the back portion 119 curves acutely inwardly to and connects with a front edge of an inner wall 121 of the pipe joint fitting 120 and defines a fitting pipe back groove 123.

As seen in the window in FIG. 1, the hook portion 144 of the compressed gasket 140 includes an outwardly extending back wall 41 that at a top edge connects to a bottom edge of an outwardly and forwardly extending back wall chamfered/beveled/angled edge 42 of the hook portion 144. A top edge of the hook portion outwardly and forwardly extending back wall chamfered/beveled/angled edge 42 connects to a back edge of a hook portion top wall 43 that extends forwardly and substantially perpendicularly away from the back wall 41. A front edge of the hook portion top wall 43 connects to a top edge of a front wall 44 that extends inwardly and substantially perpendicularly away from the top wall 43 and a bottom edge of the front wall 44 connects to a front edge of a bottom wall 45. The bottom wall 45 extends rearwardly and substantially perpendicularly away from the front wall 44 and a back edge of the bottom wall 45 connects to a bottom edge of a back wall 46 of the sealing portion 142. The sealing portion back wall 46 extends outwardly and substantially perpendicularly away from the bottom wall 45 and a top edge of the sealing portion back wall 46 connects to a bottom edge of an outwardly and forwardly extending back wall chamfered/beveled/angled edge 47 of the sealing portion 142. It should be noted that the compressed configuration of the gasket 140 described here is due to the shape of the first pipe gasket socket 114 in which it is seated and is squeezed into this shape by the inserted spigot end 121 of the pipe fitting 120. However, this is not the only compressed shape it can take and, in fact, other compressed shapes will depend on the configuration of the pipe gasket socket into which it is inserted. A top edge of the sealing portion outwardly and forwardly extending back wall chamfered/beveled/angled edge 47 connects to a back edge of a sealing portion top wall 48 that extends forwardly and substantially perpendicularly away from the sealing portion back wall 46. A front edge of the sealing portion top wall 48 connects to a back edge of an inwardly and forwardly angled groove surface 49, which, at a front edge connects to a bottom edge of the hook portion back wall 41. add The ductile iron earthquake resistant casting 120 is designed to meet all applicable requirements of AWWA C150 (de-sign), C151 (manufacture), C104 (lining), C111 (joints), C153 (fittings), C105 (polyethylene encasement), and C600 (installation). The expansion spigot in the assembly can have two assembly stripes—one indicating a fully contracted and one indicating a mid-point of extension. Full extension can be achieved by pulling the completed joint out until the retainer ring stops movement. The ductile iron casting can have a zinc-rich or zinc-clad coating applied directly onto the iron surface. In general, the casting assembly will have a red color finish top-coat (Pantone #1805) to indicate the critical nature of the material. Also, in general, the network of ductile iron pipe connected to the Earthquake Joint System shall have a protective exterior, which can include, for example, but is not limited to, having the pipe coated with a layer of an arc-sprayed zinc per ISO 8179 with a mass of the zinc applied being 200 g/m2 of pipe surface area. Also, a finishing layer topcoat can be applied to the zinc, for example, but not limited to, a coating system in conformance with ISO 8179-1, "Ductile iron pipes—External zinc-based coating—Part 1: Metallic zinc with finishing layer. Second edition 2004 Jun. 2001." In addition, the connected network of ductile iron pipe generally will be encased in V-Bio polyethylene encasement meeting the requirements of C105 concerning both materials and installation.

FIG. 2 is a cross-sectional, exploded view of the earthquake resistant push-on type pipe joint fitting of FIG. 1, in accordance with an embodiment of the disclosed subject matter. While the fitting pipe bell end 125 contains similar if not identical elements, the fitting pipe bell end 125 is longer than the first pipe bell end 105. Although, the fitting pipe gasket socket 124 is identical to the first pipe gasket socket 114, the fitting pipe front groove 127 and the fitting pipe back groove 123 are significantly longer than the first pipe front groove 117 and the first pipe back groove 113, respectively, with the exception of the second raised and inwardly extending low ridge 229. In FIG. 2, the pipe joint fitting ring 122 can be seen on the spigot end 121 of the pipe fitting 120 and contains a pipe joint fitting ring wedging surface 223 (see FIG. 2), which mates with a wedging surface 153 (see FIG. 3a) of the first snap ring 150 as shown in FIG. 1. The second gasket 160 is installed into the pipe joint fitting gasket socket 124 on the bell 125 of the pipe joint fitting 120 to provide the seal while surface 175 in FIG. 3b of the snap ring 170 fits into a pipe joint fitting front groove 127, with a snap ring surface 171 being retained by an inner flange surface 228. The pipe joint fitting front groove 127 and a pipe joint fitting back groove 123 allow the joint made with the pipe joint fitting 120 and spigot end 131 to expand and/or contract during a seismic event, with the pipe joint fitting front groove 127 is the area where the joint restraint components 132 and 170 may move axially. Similarly, the pipe joint fitting back groove 123 is the area where spigot end 131 is allowed to move while maintaining the second gasket 160 contact against the spigot end 131 to maintain the seal. A wedging surface 173 in FIG. 3b contacts a wedging surface 453 in FIG. 4 when the fitting joint is fully expanded and provides resistance to axial separation, thus keeping the integrity of the seal at the pipe joint fitting gasket socket 124. The pipe joint fitting gasket socket 124, the radially and inwardly protruding pipe joint fitting front ridge 126, the annular middle ridge 128 and the rearwardly and substantially perpendicularly extending inner wall of the back portion 129 of the bell end 125 has substantially the same configuration as the first pipe gasket socket 114. The one difference is the raised and inwardly extending low ridge 229 at a front edge of the back wall portion 129 that extends around an inner circumference of the pipe joint fitting bell end 125 immediately to the rear of the pipe joint fitting gasket socket 124 and in front of the pipe joint fitting back groove 123.

Figure 6:
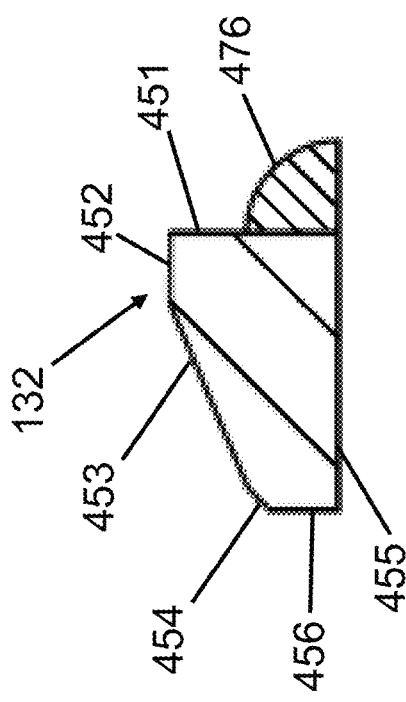
FIG. 6 is a close-up, cross-sectional view of an annular restraint component affixed to an outer circumference of the spigot end of the first pipe of FIG. 3, in accordance with an embodiment of the disclosed subject matter.

FIG. 3a is a cross-sectional view of a snap ring that fits into a bell end of the first pipe of the earthquake resistant push-on type pipe joint fitting of FIGS. 1 and 2, in accordance with an embodiment of the disclosed subject matter. The currently in use design for this type of snap ring (U.S. Pat. No. 4,643,466, which is hereby incorporated herein in its entirety), is generally annular in shape with a split through the snap ring so that in the open position, the snap ring has a larger circumference than in its closed position when installed in a pipe to bias the snap ring outwardly against an inner surface of the pipe. The snap ring 150 has a shoulder 152 with a width of between 0.06 inches and 0.09 inches, but does not contain a chamfered/beveled/angled wall 154. Surprisingly, while the moment of inertia change between the two styles of snap rings only changed by up to 14%, physical tests of the earthquake fitting, with the snap ring designs 150, 170 in FIGS. 3a, 3b and the second pipe spigot ring 132 in FIG. 6, showed the overall restraint capability of the joint was improved by approximately 40%. This provides a significantly increased resistance to axial separation of the earthquake fitting compared to standard restrained pipe joints, providing a greater chance for water service to remain uninterrupted during and after a seismic event. As seen in FIG. 3a the snap ring 150 includes the inwardly depending front wall 151, which at a bottom edge connects to a front edge of the rearwardly and substantially perpendicularly extending shoulder 152. A back edge of the rearwardly and substantially perpendicularly extending shoulder 152 connects to a front edge of the outwardly and rearwardly angled wedging surface 153. A back edge of the outwardly and rearwardly angled wedging surface 153 connects to a bottom edge of an outwardly and rearwardly extending chamfered/beveled/angled wall 154 and a top edge of the outwardly and rearwardly extending chamfered/beveled/angled wall 154 connects to a bottom edge of an outwardly extending back wall 156 of the snap ring 150, which perpendicularly connects to a back edge of an outer wall 155 of the snap ring 150.

FIG. 3b is a cross-sectional view of a snap ring that fits into a bell end of the fitting pipe of the earthquake resistant push-on type pipe joint fitting of FIGS. 1 and 2, in accordance with an embodiment of the disclosed subject matter. The currently in use design for this type of snap ring (U.S. Pat. No. 4,643,466) has a shoulder 172 with a width of between 0.06 inches and 0.09 inches, but does not contain a chamfered/beveled/angled wall 174. Surprisingly, while the moment of inertia change between the two styles of snap rings only changed by up to 14%, physical tests of the earthquake fitting, with the snap ring designs 150, 170 in FIGS. 3a, 3b and the second pipe spigot ring 132 in FIG. 6, showed the overall restraint capability of the joint was improved by approximately 40%. This provides a significantly increased resistance to axial separation of the earthquake fitting compared to standard restrained pipe joints, providing a greater chance for water service to remain uninterrupted during and after a seismic event. As seen in FIG. 3b the snap ring 170 includes the inwardly depending front wall 171, which at a bottom edge connects to a front edge of the rearwardly and substantially perpendicularly extending shoulder 172. A back edge of the rearwardly and substantially perpendicularly extending shoulder 172 connects to a front edge of the outwardly and rearwardly angled wedging surface 173. A back edge of the outwardly and rearwardly angled wedging surface 173 connects to a bottom edge of the outwardly and rearwardly extending chamfered/beveled/angled wall 174 and a top edge of the outwardly and rearwardly extending chamfered/beveled/angled wall 174 connects to a bottom edge of an outwardly extending back wall 176 of the snap ring 170, which perpendicularly connects to the back edge of an outer wall 175 of the snap ring 170.

FIG. 4 is a partial longitudinal, cross-sectional view of the spigot end 131 of the second pipe 130 of FIG. 1 with the first annular restraint component 132 fixedly attached around an outer circumference of the spigot end of the second pipe 130, in accordance with an embodiment of the disclosed subject matter. In FIG. 4, the first annular restraint component 132, i.e., the second pipe spigot ring 132, is fixedly attached to an outer circumference of the second pipe spigot end 131 by a welded joint formed by a welding bead 476 between the weld ring surface front wall 451 and the second pipe spigot end 131. The first annular restraint component 132 includes the first annular restraint component wedging surface 453, which at a back edge connects to a front edge of a rearwardly extending shoulder 452. A back edge of the shoulder 452 connects to a top edge of the inwardly extending front wall 451, which contacts and is welded to the outer circumference of the second pipe spigot 131 by the welding bead 476. A front edge of the first annular restraint component wedging surface 453 connects to a back edge of a chamfer/beveled wall 454 and a front edge of the chamfer/beveled wall 454 connects to a top edge of a first annular restraint component back wall 456, which at a bottom edge connects/contacts with the second pipe spigot end 131.

Figure 5:
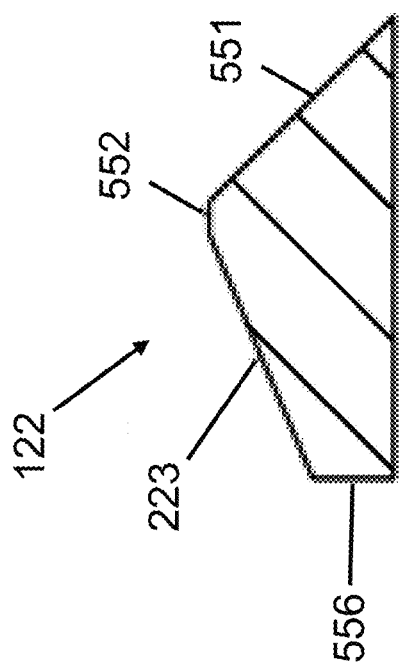
FIG. 5 is a close-up, cross-sectional view of an integral, annular raised ring on an outer circumference of the spigot end of the earthquake resistant push-on type pipe joint fitting of FIG. 1, in accordance with an embodiment of the disclosed subject matter.

FIG. 5 is a close-up, cross-sectional, reversed view of the integral, annular raised ring on an outer circumference of the spigot end of the earthquake resistant push-on type pipe joint fitting of FIG. 1, in accordance with an embodiment of the disclosed subject matter. In FIG. 5, a fitting pipe spigot ring 122 includes a fitting pipe ring wedging surface 223 configured to contact the wedging surface 153 of the snap ring of FIG. 3a, which is used in pipe joint 110 of FIG. 1. Wedging surfaces 153 in FIG. 3a, 223 in FIG. 5, and 453 in FIG. 6 all have an angle from 15° to 30° relative to the axis of the ring. Shoulders 152, 552, 452 all have a width of 0.12 inches to 0.25 inches. Bevels 154, as shown in FIG. 3a, 174 in FIG. 3b and 454 in FIG. 6, assist in the installation of the snap rings 150, 170 on the spigot side of the fitting and on the spigot side of the second pipe as well as on the regular restrained pipe joint that utilizes this system for restraint.

In FIG. 5, the pipe joint fitting ring 122 includes the pipe joint fitting ring wedging surface 223, which connects at a front edge to a top edge of an outwardly extending back wall 556. A bottom edge connects to and is part of the spigot end 121 of the pipe fitting 120. A bottom edge of the pipe joint fitting ring wedging surface 223 to a front edge of the should 552, which extends rearwardly and, at a back edge, connects to a top edge of an elongated back wall 551, which extends outwardly and rearwardly toward, connects to and is an integral part of the spigot end 121.

FIG. 6 is a close-up, cross-sectional, reversed view of the annular restraint component 132 that is affixed to the outer circumference of the spigot end 131 of the second pipe 130 of FIG. 4, in accordance with an embodiment of the disclosed subject matter. In FIG. 6, the second annular pipe fitting spigot ring 132 includes a second pipe fitting ring wedging surface 453 configured to contact the wedging surface 153 of the snap ring of FIG. 3a, which is used in pipe joint 110 of FIG. 1. Wedging surfaces 153 in FIG. 3a, 223 in FIG. 5, and 453 in FIG. 6 all have an angle from 15° to 30° relative to the axis of the ring. Shoulders 152, 552, 452 all have a width of 0.12 inches to 0.25 inches. Bevels 154, as shown in FIG. 3a, 174 in FIG. 3b and 454 in FIG. 6, assist in the installation of the snap rings 150, 170 on the spigot side of the fitting and on the spigot side of the second pipe as well as on the regular restrained pipe joint that utilizes this system for restraint. In addition, a bottom surface 455 extends between and connects to respective bottom edges of the back wall 451 and the front wall 456 of the second annular pipe fitting spigot ring 132.

Figure 7:
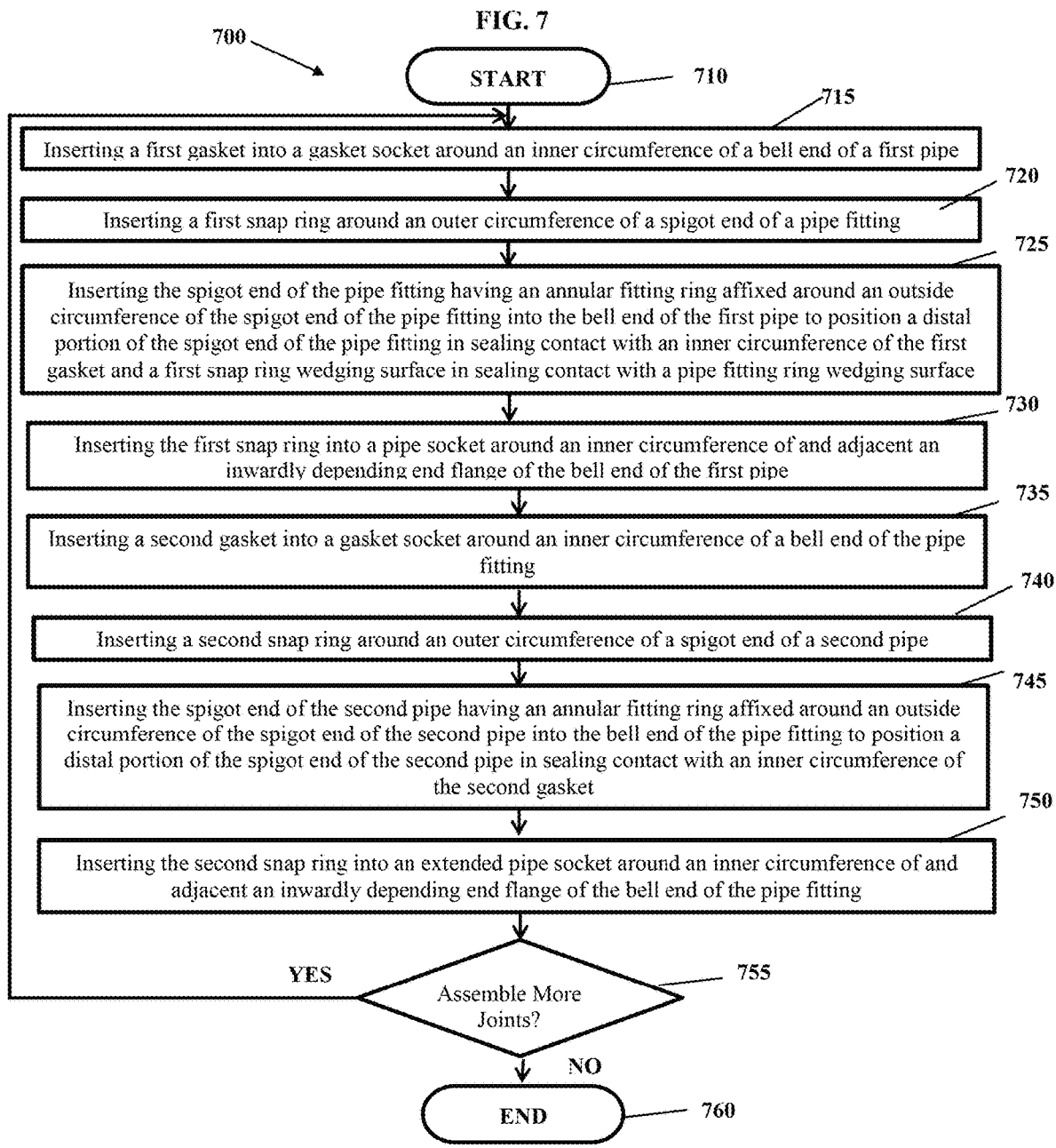
FIG. 7 is a flow chart of a method of assembling a bell and spigot pipe joint with the spigot end of the earthquake resistant push-on type pipe joint fitting of FIG. 1 inserted into a bell end of a second pipe and the bell end of the earthquake resistant push-on type pipe joint fitting inserted around a spigot end of the first pipe of FIG. 1 and the pipe joint including annular snap rings and annular gaskets, in accordance with an embodiment of the disclosed subject matter.

FIG. 7 is a flow chart of a method of assembling a bell and spigot pipe joint with the spigot end of the earthquake resistant push-on type pipe joint fitting of FIG. 1 inserted into a bell end of a second pipe and the bell end of the earthquake resistant push-on type pipe joint fitting inserted around a spigot end of the first pipe of FIG. 3 and the pipe joint including annular snap rings and annular gaskets, in accordance with an embodiment of the disclosed subject matter. It is contemplated that the pipe joint assembly may be partially assembled when delivered to a job site. For example, an earthquake resistant push-on type pipe joint fitting 120, which can also be referred to as a central earthquake casting 120, can be connected to the spigot end 131 of the second pipe 130.

In FIG. 7, a method 700 of assembling a bell and spigot pipe joint with the spigot end of the earthquake resistant push-on type pipe joint fitting starts 710 and then a first gasket is inserted 715 into a gasket socket around an inner circumference of a bell end of a first pipe and a first snap ring is inserted 720 around an outer circumference of a spigot end of a pipe fitting. The method includes inserting 725 the spigot end of the pipe fitting having an annular fitting ring affixed around an outside circumference of the spigot end of the pipe fitting into the bell end of the first pipe to position a distal portion of the spigot end of the pipe fitting in sealing contact with an inner circumference of the first gasket and a first snap ring wedging surface in sealing contact with a pipe fitting ring wedging surface, and inserting 730 the first snap ring into a pipe socket around an inner circumference of and adjacent an inwardly depending end flange of the bell end of the first pipe. The method further includes inserting 735 a second gasket into a gasket socket around an inner circumference of a bell end of the pipe fitting, and inserting 740 a second snap ring around an outer circumference of a spigot end of a second pipe. The method then includes inserting 745 the spigot end of the second pipe having an annular fitting ring affixed around an outside circumference of the spigot end of the second pipe into the bell end of the pipe fitting to position a distal portion of the spigot end of the second pipe in sealing contact with an inner circumference of the second gasket and inserting 750 the second snap ring into an extended pipe socket around an inner circumference of and adjacent an inwardly depending end flange of the bell end of the pipe fitting. The method also includes determining 755 whether more pipe joints are to be assembled and, if more are to be made, returning to inserting step 715 and, if no more pipe joints are to be assembled, then the method ends 760.

Although the above assembly method can be performed entirely by a single entity, it can also be performed by two or more entities. In addition, the assembly method can be performed by the one or more entities all at once or in stages. For example, the first pipe 110 and the earthquake resistant push-on type pipe joint fitting 120 components can be assembled first and then transported to a final assembly and installation location by the one or more entities. The earthquake joint can be assembled in a fully contracted position, which allows for maximum longitudinal expansion; in a mid-point position, which allows for both longitudinal joint expansion and contraction, or in a fully extended position, which allows for maximum longitudinal joint contraction.

FIG. 8 is an exploded, partial cross-sectional side view of a portion of a bell and spigot pipe joint with a spigot end of a pipe separated from a bell end of a push-on type pipe joint fitting including an annular snap ring around the spigot end of the pipe of the earthquake resistant push-on type pipe joint fitting of FIG. 1, in accordance with an embodiment of the disclosed subject matter. In FIG. 8, a cut-off end section of the pipe spigot 131 of the second pipe 130 is shown to include the fixed annular pipe spigot ring 132 that is attached to an outside diameter (i.e., around an outer circumference) of the pipe spigot 131 and a snap ring 170 adjacent a back end of the pipe spigot 131. An end of the pipe spigot 131 is shown adjacent to a bell end 125 of an earthquake resistant push-on type pipe joint fitting 120. The extended, front groove 127 extends around an inner circumference of the bell end of the earthquake resistant push-on type pipe joint fitting 120 from a back end of the bell end flange 228 to a front side of a gasket groove/socket 124 that also extends around an inner circumference of the bell end of the earthquake resistant push-on type pipe joint fitting 120. A spigot end 121 of the earthquake resistant push-on type pipe joint fitting 120, which has a diameter that is smaller than a diameter of the bell end of the earthquake resistant push-on type pipe joint fitting 120, has the fixed annular pipe fitting spigot ring 122 that is machined around an outside diameter (i.e., around an outer circumference) of the spigot end 121 of the earthquake resistant push-on type pipe joint fitting 120.

Figure 9:
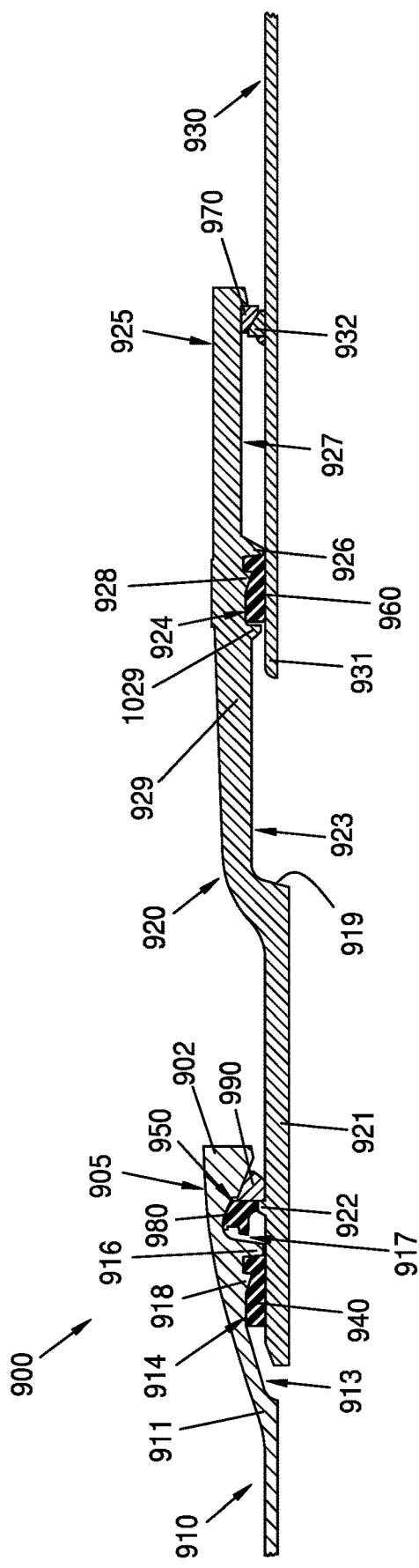
FIG. 9 is a partial longitudinal, cross-sectional view of a bell and spigot pipe joint with the spigot end of an earthquake resistant push-on type pipe joint fitting inserted into a bell end of a first pipe and the bell end of the push-on type pipe joint fitting inserted around a spigot end of a second pipe and the pipe joint including an annular snap ring, an annular iron segment and rubber dual-component, gasket and an annular rubber gasket, in accordance with another embodiment of the disclosed subject matter.

FIG. 9 is a partial longitudinal, cross-sectional view of a bell and spigot pipe joint 900 with a spigot end 921 of an earthquake resistant push-on type pipe joint fitting 920 inserted into a bell end 905 of a first pipe 910 with an outer surface 911 and a flanged end 902, and a bell end 925 of the push-on type pipe joint fitting inserted around a spigot end 931 of a second pipe 930 and the pipe joint 900 including an annular snap ring 970, a restraining ring 950 with multiple iron segments 990 and a rubber ring 980, and two annular rubber gaskets 940, 960, in accordance with another embodiment of the disclosed subject matter. Specifically, the embodiment shown and described in relation to FIG. 9, as well as FIGS. 10-18, is for large diameter pipe such as, for example, but not limited to, pipe that is in general 14 inches and larger in diameter. This design difference is due to slightly different designs being used for the bell ends of the larger pipe sizes. While the following description is of the earthquake resistant push-on type pipe joint fitting 920 cross-section in FIG. 9, which is generally related to 14"-16" pipe, it is understood that the entire earthquake resistant push-on type pipe joint fitting 920 is a continuous, cylindrical fitting that can be made in a variety of different diameters to fit the various pipe diameters in which it is designed to be used. The iron segments of the restraining ring 950 are made of a hardened metal, for example, but not limited to, a ductile iron and/or other galvanic corrosion-limiting materials. In addition, in the one or more embodiments, the annular gaskets 940, 960 can be made of a "soft" rubber such as defined in the American Water Works Association Standard ANSI/AWWA C111/A21.11 and having a Shore "A" durometer hardness of about 50 to 70, but is not necessarily limited to the materials shown there. For example, in another embodiment, the annular gaskets 940, 960 can be made of both a "soft" rubber sealing portion having a Shore "A" durometer hardness of around 65+/−5 and a hard rubber hook portion having a Shore "A" durometer hardness of around 85+/−5, see, for example, the close-up view of the gasket 140 in FIG. 1, which is the same as gasket 940 as shown in FIGS. 9, 10 and 11.

In FIG. 9, the first pipe bell end 905 is assembled onto the spigot end 921 of the pipe fitting 920 using the first gasket 940 installed in a first pipe gasket socket 914 for sealing purposes and the annular iron segment and rubber ring restraining ring 950 installed into a first pipe front socket/groove 917 of the first pipe bell end 905 to mate with a circumferential weld bead 922 around the spigot end 921 of the earthquake resistant push-on type pipe joint fitting 920 to prevent joint disengagement. Similar to the machined pipe fitting ring 122 in the smaller diameter embodiments shown in FIG. 1, in the larger diameter embodiments, the circumferential weld bead 922 is also machined circumferentially around the spigot end 921. At the socket/bell end of the pipe fitting 925 the spigot end 931 of the second pipe 930 is inserted into the bell end 925 of the pipe fitting using the second gasket 960 installed in a fitting pipe gasket socket 924 for sealing purposes. The snap ring 970 is installed in an extended front socket/groove 927 of the pipe fitting socket to mate with a second pipe spigot ring 932 that is fixedly attached, e.g., but not limited to, welded, to an outside diameter (i.e., around an outer circumference) of the spigot end of the second pipe 930. In addition, the flanged end 902 has a different size and configuration than the flanged end of the first pipe bell end 105 in FIG. 1 and will be described herein in relation to FIG. 10.

Although not shown in FIG. 9, the close-up view showing details of the expected shape of the compressed first gasket 140, which is the same as the second gasket 160, in FIG. 1, is, although not exactly identical to, but it is representative of the compressed shapes of the first and second gaskets 940, 960 shown in FIG. 9. Specifically, as with the gaskets 140, 160 of FIG. 1, the gaskets 940, 960 of FIG. 9 can be the Fastite® Pipe Gasket that is manufactured by the Applicant, American Cast Iron Pipe Company of Birmingham, Ala. However due to slight configuration differences in the gasket sockets into which the gaskets 940, 960 are inserted, the expected compressed configuration of the gaskets will vary slightly, although the seal formed between the gaskets and the spigot ends are basically the same. The gasket 960 is installed in a pipe joint fitting gasket socket 924 that has a radially and inwardly protruding front ridge 926 with an inwardly and rearwardly extending front wall connected at a top edge to a front edge of a flat inner wall portion that at a back edge is in turn connected to top edge of a perpendicularly and outwardly extending back wall. A bottom edge of the perpendicularly and outwardly extending back wall connects to a front edge of a rearwardly extending inner wall of a front groove in the pipe joint fitting gasket socket 924. A back edge of the rearwardly extending inner wall connects to a top edge of a front wall of an annular angled middle ridge 928. The front wall extends substantially perpendicularly and inwardly away from the rearwardly extending inner wall and a bottom edge of the front wall of the annular angled middle ridge 928 connects to a bottom edge of an outwardly and rearwardly extending angled back wall of the annular angled middle ridge 928. A top edge of the outwardly and rearwardly extending angled back wall of the annular angled middle ridge 928 connects to a front edge of a rearwardly extending inner wall of a back groove in the pipe joint fitting gasket socket 924. A back edge of the rearwardly extending inner wall of the back groove in the pipe joint fitting gasket socket 924 connects to a top edge of an inwardly and perpendicularly extending back wall of the back groove in the pipe joint fitting gasket socket 924. A bottom edge of the inwardly and perpendicularly extending back wall of the back groove connects to a front edge of a rearwardly and substantially perpendicularly extending inner wall of a second, low radially and inwardly extending low ridge 1029 that, at a back edge slopes outwardly toward and connects to a front edge of a rearwardly extending back portion 929 of the bell end 925. A back edge portion 919 of the rearwardly and substantially perpendicularly extending inner wall of the back portion 929 curves acutely inwardly to and connects with a front edge of an inner wall 921 of the pipe joint fitting 920 and defines a fitting pipe back groove 923.

As further seen in FIG. 9, the iron segment and rubber ring restraining ring 950, which generally is used for pipes having 14"-16" diameters, and can be a specially manufactured Flex-Ring® pipe. Although not shown here, other embodiments of the specially manufactured Flex-Ring® pipe, restraining ring for larger-size Flex-Ring® pipe (e.g., 18"-60" Outside Diameter (O.D.) pipe) have slightly different designs with proportionally larger rubber and iron segment components to account for the design differences in the bell ends of the larger sized pipe.

Figure 10:
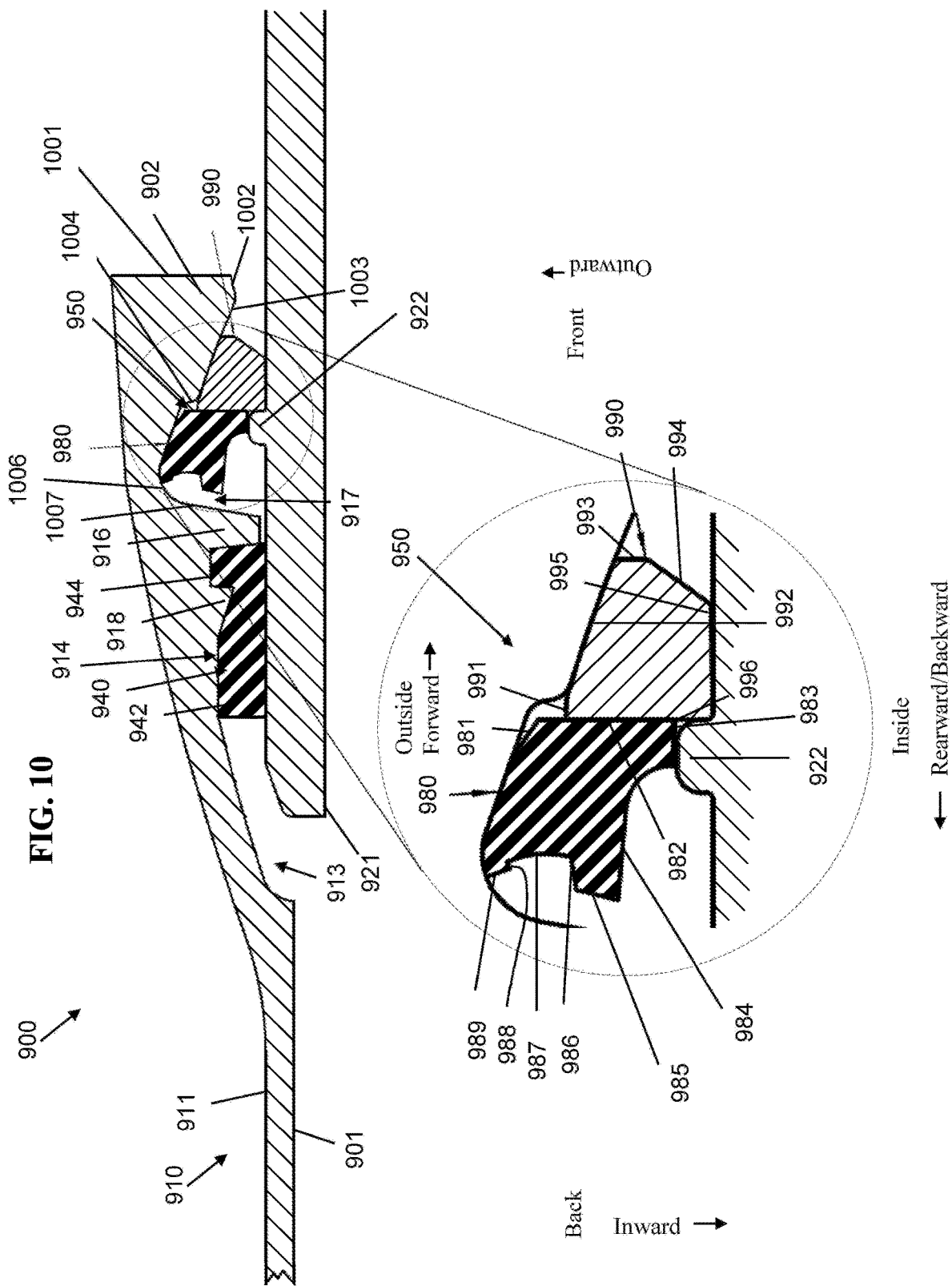
FIG. 10 is a partial, cross-sectional view showing the spigot end of the earthquake resistant push-on type pipe joint fitting inserted into the bell end of the first pipe of FIG. 9 with a close-up, cross-sectional view of the compressed gasket, in accordance with the another embodiment of the disclosed subject matter.
Figure 11:
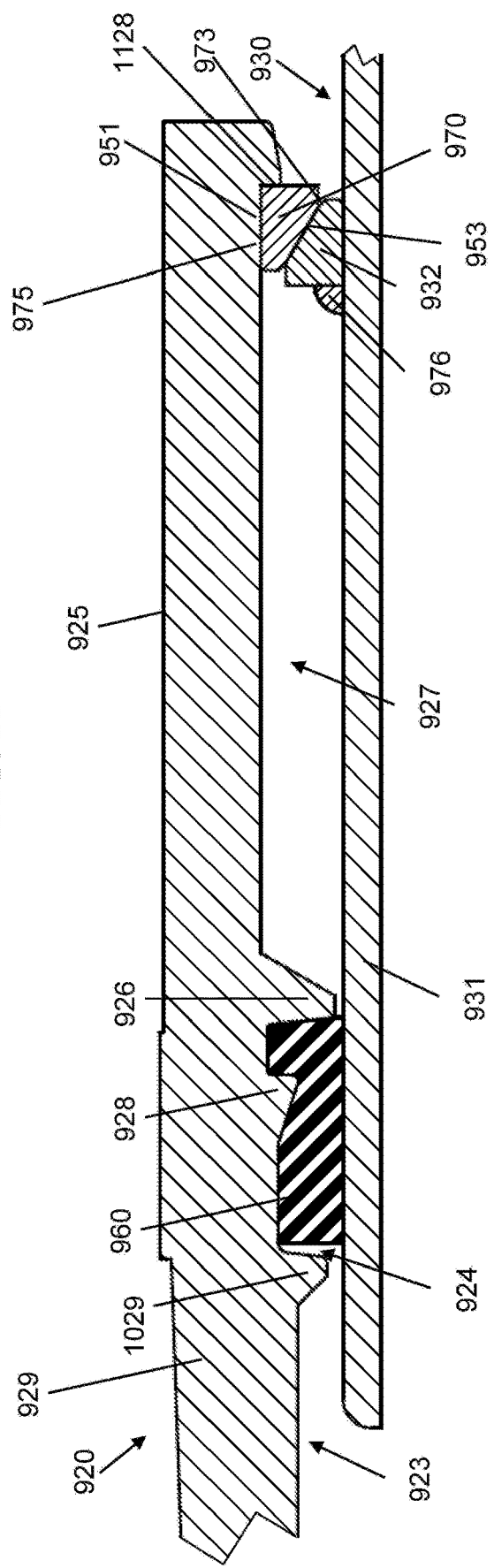
FIG. 11 is a cross-sectional view of a gasket that fits into a bell end of the earthquake resistant push-on type pipe joint fitting of FIGS. 9 and 10, in accordance with the another embodiment of the disclosed subject matter.

FIG. 10 is a partial, cross-sectional view showing the spigot end 921 of the earthquake resistant push-on type pipe joint fitting 920 inserted into the bell end 905 of the first pipe 910 of FIG. 9 with a close-up, cross-sectional view of annular iron segment and rubber dual-component restraining ring 950 in a compressed position, in accordance with the another embodiment of the disclosed subject matter. In FIG. 10, instead of the sharp-edged flange of the bell ends 105, 125 of the first pipe 110 and the earthquake resistant push-on type pipe joint fitting 120 in FIG. 1, the first pipe bell end 905 includes the larger and thicker flange end 902. Specifically, the first pipe bell end 905 includes a front edge of the outer surface 911 of the first pipe 910 connected to a top edge of a bell end front surface 1001 that extends substantially inwardly and perpendicularly away from the outer surface 911 of the first pipe 910. A bottom edge of the bell end front surface or flange front surface 1001 is connected to a front edge of a rearwardly and slightly inwardly angled inside flange lip 1002 and a back edge of the slightly inwardly angled inside flange lip 1002 is connected to a front edge of a rearwardly and outwardly angled flange wedging surface 1003. A back edge of the rearwardly and outwardly angled flange wedging surface 1003 curves outwardly and is connected to an inwardly curving bottom end of a back wall 1004 of the flange. A top end of the back wall 1004 of the flange curves slightly rearwardly and outwardly and connects to a front edge of an inwardly and rearwardly angled top wall 1005 of the first pipe front groove 917. A top edge of the inwardly and rearwardly angled top wall 1005 curves inwardly and rearwardly away from the angled top wall 1005 and connects to a top edge of a similarly outwardly and forwardly angled back wall 1007 of the first pipe front groove 917.

Also in FIG. 10, the first gasket 940, which is that same as the second gasket 960, and, the gaskets 940, 960 of FIG. 9, like the gaskets 140, 160 of FIG. 1, can be a Fastite Gasket that is manufactured by the Applicant, American Cast Iron Pipe Company of Birmingham, Ala. In FIG. 10, the first gasket 940 has a front or hook portion 944 that is connected to a back or sealing portion 942. The first gasket 940 has a shape that reciprocally fits into and is held by a first pipe gasket socket 914 that is formed in and around an inner circumference of the bell end 905 of the first pipe 910. The first pipe gasket socket 914 has a radially and inwardly protruding front ridge 916 with an inwardly and rearwardly extending front wall connected at a top edge to front edge of a flat inner wall portion that at a back edge is in turn connected to top edge of a perpendicularly and outwardly extending back wall. A bottom edge of the perpendicularly and outwardly extending back wall connects to a front edge of a rearwardly extending inner wall of a front groove in the first pipe gasket socket 914. A back edge of the rearwardly extending inner wall connects to a top edge of a front wall of an annular angled middle ridge 918. The front wall extends substantially perpendicularly and inwardly away from the rearwardly extending inner wall and a bottom edge of the front wall of the annular angled middle ridge 918 connects to a bottom edge of an outwardly and rearwardly extending angled back wall of the annular angled middle ridge 918. A top edge of the outwardly and rearwardly extending angled back wall of the annular angled middle ridge 918 connects to a front edge of a rearwardly extending inner wall of a back groove in the first pipe gasket socket 914. A back edge of the rearwardly extending inner wall of the back groove connects to a top edge of an inwardly and rearwardly extending inner wall of a back portion 919 of the bell end 905. A back edge portion of the rearwardly and substantially perpendicularly extending inner wall of the back portion 919 increasingly curves inwardly to and connects with a front edge of an inner wall 901 of the first pipe 910.

As seen in the enlarged window in FIG. 10, the annular iron segment and rubber dual-component restraining ring 950 includes a rubber ring 980 that is fixedly, connected to multiple arced and non-contiguous iron segments 990. As shown in FIG. 10, the outer diameter of the rubber ring 980 is greater than the outer diameter formed by the iron segments 990 connected to a back of the rubber ring 980. For example, the iron segments 990 can be bolted to a front side of the rubber ring 980 with 2 or more bolts and washers per iron segment 990 (see FIG. 17).

In the exploded view of the compressed and installed restraining ring 950 in FIG. 10, a rubber ring portion front wall 982 abuts a back wall 996 of the iron segment 990. A bottom edge of the iron segment back wall 996 connects to a back edge of a bottom wall 995 of the iron segment 990 that extends forwardly and slightly inwardly, for example, about 1 degree inwardly, away from the iron segment back wall 996. A front edge of the iron segment bottom wall 995 connects to a bottom edge of a forwardly and outwardly angled lower wall 994, which, at a top edge connects to a bottom edge of an outwardly extending middle wall 993 of the iron segment 990. The outwardly extending middle wall 993 is substantially perpendicular to the bottom wall 995 and substantially parallel to the back wall 996 and, at a top edge, the middle wall 993 connects to a front edge of an outwardly and rearwardly extending top front wall 992. A top edge of the top front wall 992 connects to a front edge of a rearwardly extending top wall 991 and a back edge of the rearwardly extending top wall 991 connects to a top edge of the back wall 996.

In FIG. 10, the rubber ring 980 includes an angled top wall 981 that slopes from a high point on the back side of the rubber ring 980 to a low point where a front edge of the angled top wall 981 connects with a top edge of the inwardly extending rubber portion front wall 982. A bottom edge of the inwardly extending rubber portion front wall 982 connects to a front edge of a rearwardly and substantially perpendicularly extending bottom wall 984. A back edge of the rearwardly and substantially perpendicularly extending front bottom wall section 983 connects to a bottom edge of the back bottom wall section 984. The back bottom wall section 984 extends rearwardly and slightly outwardly away from the front bottom wall section 983. A back edge of the back bottom wall section 984 connects with a bottom edge of an outwardly and slightly forwardly angled lower back wall section 985, which, at a top edge connects to a back edge of a slightly forwardly and outwardly angled lower, middle wall portion 986. A front edge of the slightly forwardly and outwardly angled lower, middle wall portion 986 curves upwardly to and merges with a bottom edge of an outwardly extending middle back wall section 987. A top portion of the outwardly extending middle back wall section 987 curves slightly rearwardly to connect to a front edge of a short, rearwardly and inwardly extending lip 988, which at a back edge connects to a top edge to a bottom edge of an outwardly and forwardly extending a top back wall section 989, and a top edge of the top back wall section 989 connects to a back edge of the angled top wall 981. Although not shown in FIG. 10, multiple fasteners can be used to connect the iron segments 990 to the rubber ring 980 and these fasteners are shown and described below in relation to FIG. 17.

FIG. 11 is a close-up, cross-sectional view of a gasket that fits into a bell end of the earthquake resistant push-on type pipe joint fitting of FIGS. 9 and 10, in accordance with the another embodiment of the disclosed subject matter. In FIG. 11, while the fitting pipe gasket socket 924 is similar to the first pipe gasket socket 914, the fitting pipe front groove 927 and the fitting pipe back groove 923 are significantly longer than the first pipe front groove 917 and the first pipe back groove 913, with the exception of the second, low radially and inwardly extending low ridge 1029 that is described below. The second gasket 960 is installed into the fitting pipe gasket socket 924 on the bell 925 of the pipe fitting 920 to provide the seal while an outer surface 975 of the snap ring 970 fits into the fitting pipe front groove 927, with a snap ring surface 951 being retained by an inner flange surface 1128. The fitting pipe front groove 927 and a fitting pipe back groove 923 allow the joint made with pipe fitting 920 and spigot end 931 to expand and/or contract during a seismic event, with the fitting pipe front groove 927 in the area where the joint restraint components 932 and 970 may move axially. Similarly, the fitting pipe back groove 923 is the area where spigot end 931 is allowed to move while maintaining the second gasket 960 contact against the spigot end 931 to maintain the seal. A wedging surface 973 on the snap ring 970 contacts a wedging surface 953 on the welded joint ring 932 on the spigot end 931 of the second pipe 930 when the fitting joint is fully expanded and provides resistance to axial separation, thus keeping the integrity of the seal at the fitting pipe gasket socket 924. The fitting pipe gasket socket 924, a radially and inwardly protruding fitting pipe front ridge 926, an annular angled middle ridge 928 and a rearwardly and substantially perpendicularly extending inner wall of a back portion 929 of the bell end 925 has substantially the same configuration as the first pipe gasket socket 914. The one difference is the second, low radially and inwardly extending low ridge 1029 at a front edge of the back wall portion 929 that extends around an inner circumference of the pipe fitting bell end 925 immediately to the rear of the fitting pipe gasket socket 924 and in front of the fitting pipe back groove 923.

Figure 12:
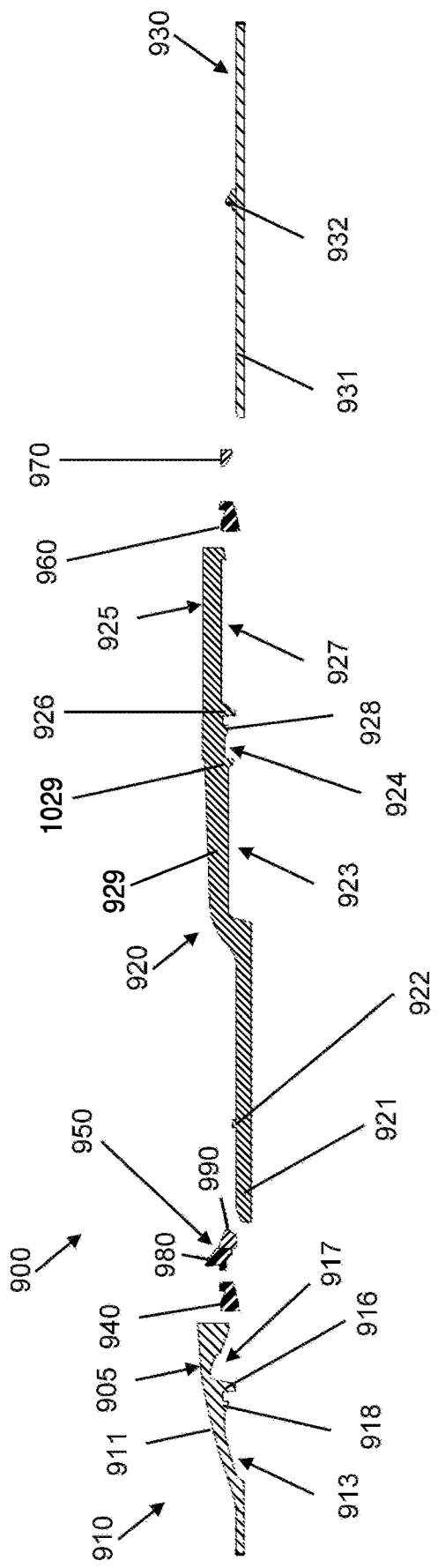
FIG. 12 is a partial, exploded, longitudinal, cross-sectional view of the bell and spigot pipe joint of FIG. 9, in accordance with the another embodiment of the disclosed subject matter.

FIG. 12 is an exploded, longitudinal, cross-sectional view of the bell and spigot pipe joint of FIG. 9, in accordance with the another embodiment of the disclosed subject matter.

Figure 13:
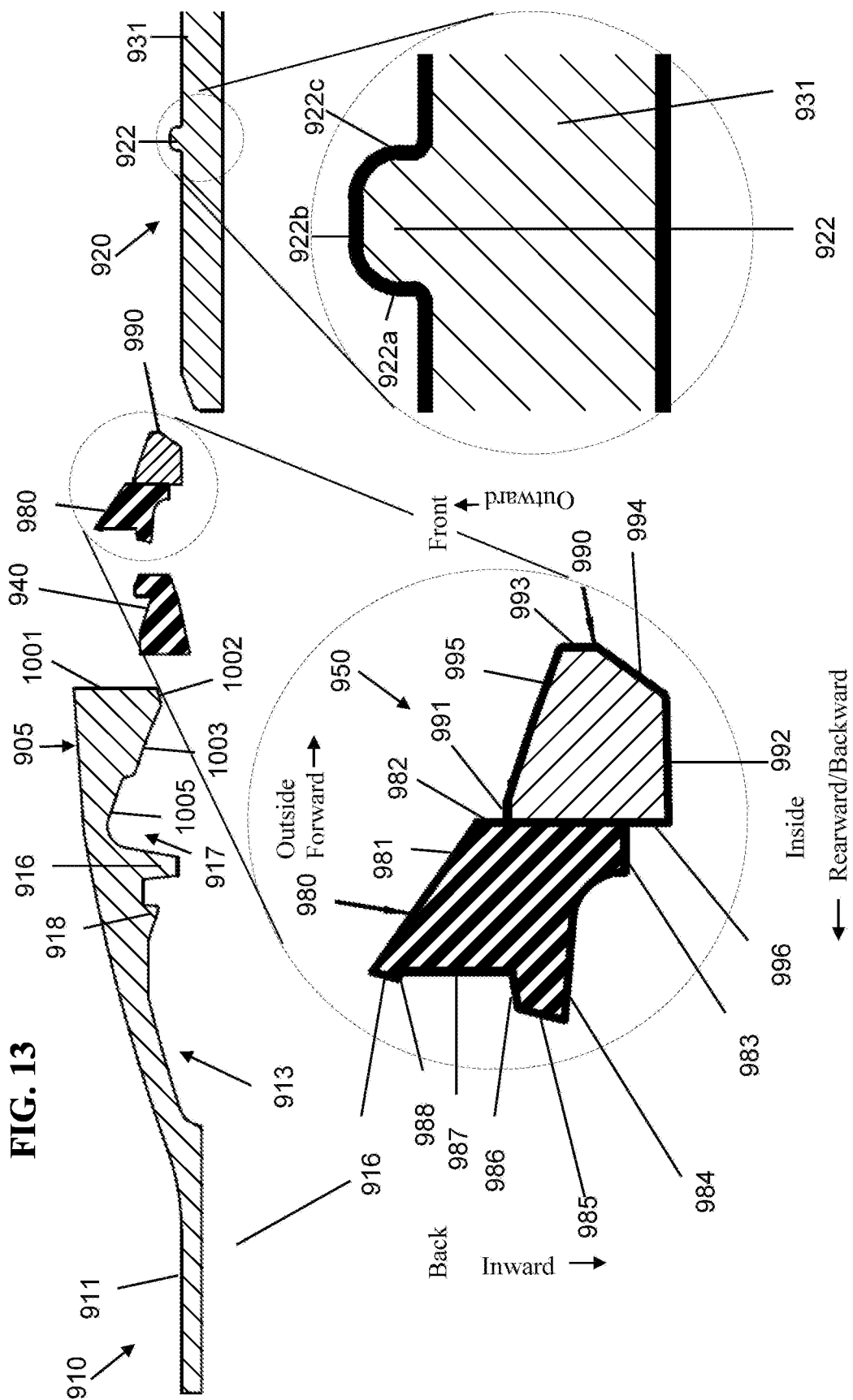
FIG. 13 is a close-up of the exploded, cross-sectional view of the bell end of the first pipe and the spigot end of the earthquake resistant push-on type pipe joint fitting including an uncompressed rubber backed restraint ring and the at least one gasket of FIG. 12 with close-up views of the uncompressed rubber backed restraint ring and restraining ridge, in accordance with the another embodiment of the disclosed subject matter.
Figure 14:
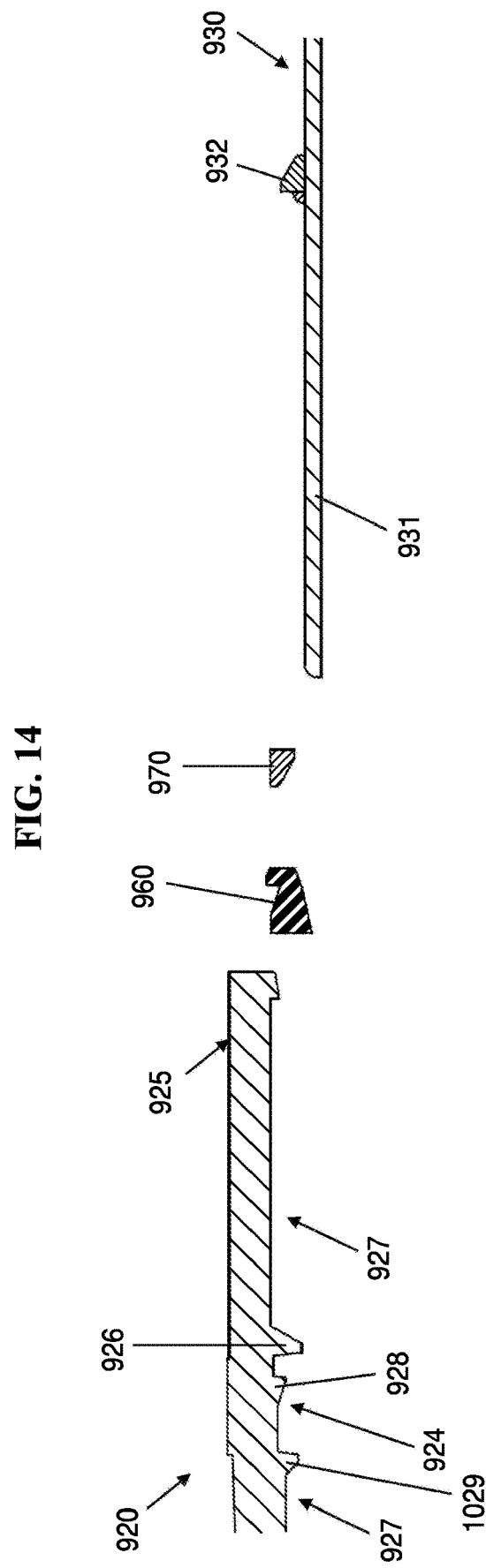
FIG. 14 is a close-up of the exploded, cross-sectional view of the bell end of the earthquake resistant push-on type pipe joint fitting and the spigot end of the second pipe including the at least one snap ring and the at least one gasket of FIG. 12, in accordance with the another embodiment of the disclosed subject matter.

FIG. 13 is a close-up of the exploded, cross-sectional view of the bell end of the first pipe and the spigot end of the earthquake resistant push-on type pipe joint fitting including the at least one rubber backed restraining ring and the at least one gasket of FIG. 12 with close-up views of the uncompressed rubber backed restraining ring and restraining ridge, in accordance with the another embodiment of the disclosed subject matter. In FIG. 13, there are several design differences from the embodiment shown and described in relation to FIGS. 1-8. Specifically, the design of the pipe bell end flange 905, the sealing gasket groove 913, the restraining ring 950, and the machined weld bead 922.

In the close-up view of the uninstalled and uncompressed restraining ring 950 in FIG. 13, a rubber ring portion front wall 982 abuts a back wall 996 of the iron segment 990. A bottom edge of the iron segment back wall 996 connects to a back edge of a bottom wall 995 of the iron segment 990 that extends forwardly and inwardly at about 1 degree away from the iron segment back wall 996. A front edge of the iron segment bottom wall 995 connects to a bottom edge of a forwardly and outwardly angled lower wall 994, which, at a top edge connects to a bottom edge of an outwardly extending middle wall 993 of the iron segment 990. The outwardly extending middle wall 993 is substantially perpendicular to the bottom wall 995 and substantially parallel to the back wall 996 and, at a top edge, the middle wall 993 connects to a front edge of an outwardly and rearwardly extending top front wall 992. A top edge of the top front wall 992 connects to a front edge of a rearwardly extending top wall 991 and a back edge of the rearwardly extending top wall 991 connects to a top edge of the back wall 996.

In FIG. 13, the rubber ring 980 can include an angled top wall 981 that slopes at about 35±3 degrees from a high point on the back side of the rubber ring 980 to a low point where a front edge of the angled top wall 981 it connects with a top edge of the inwardly extending rubber portion front wall 982. A bottom edge of the inwardly extending rubber portion front wall 982 connects to a front edge of a rearwardly and substantially perpendicularly extending bottom wall 983. A back edge of the rearwardly and substantially perpendicularly extending front bottom wall section 983 connects to a bottom edge of the back bottom wall section 984. The back bottom wall section 984 extends rearwardly and slightly outwardly at about 5 degrees away from the front bottom wall section 983. A back edge of the back bottom wall section 984 connects with a bottom edge of an outwardly and slightly forwardly angled lower back wall section 985, which, extends forwardly at about 14 degrees toward and at a top edge connects to a back edge of a slightly forwardly and outwardly angled lower, middle wall portion 986. A front edge of the slightly forwardly and outwardly angled lower, middle wall portion 986 extends upwardly at about 10 degrees toward and merges with a bottom edge of an outwardly extending middle back wall section 987. A top portion of the outwardly extending middle back wall section 987 curves slightly rearwardly to connect to a front edge of a short, rearwardly and outwardly extending lip 988, which extends outwardly at about 20 degrees and a back edge thereof connects to a bottom edge of an about 14 degree outwardly and forwardly extending top back wall section 989, and a top edge of the top back wall section 989 connects to a back edge of the angled top wall 981. Although not shown in FIG. 13, multiple fasteners are used to connect the iron segments 990 to the rubber ring 980 and these fasteners are shown and described below in relation to FIG. 17.

In the close-up view of the uninstalled machined weld bead 922 in FIG. 13, the machined weld bead 922 is affixed completely around the outer diameter of the spigot end 931 of the second pipe 930 and includes a back wall 922a that at a back bottom edge connects to and extends outwardly and substantially perpendicularly away from the spigot end 931 of the second pipe 930. A top edge of the back wall 922a connects via a rounded corner with a back edge of a substantially flat top wall 922b of the machined weld bead 922 and the top wall 922b surface is substantially parallel to the surface of the spigot 931. Similarly, the front edge of the top wall 922b connects via a rounded corner to a top edge of a front wall 922c that extends inwardly and substantially perpendicularly away from the top wall 922b. A bottom edge of the front wall 922c is also affixed to the spigot end 931 of the second pipe.

FIG. 14 is a close-up of the exploded, cross-sectional view of the bell end of the earthquake resistant push-on type pipe joint fitting and the spigot end of the second pipe including the at least one snap ring and the at least one gasket of FIG. 12, in accordance with the another embodiment of the disclosed subject matter.

Figure 15:
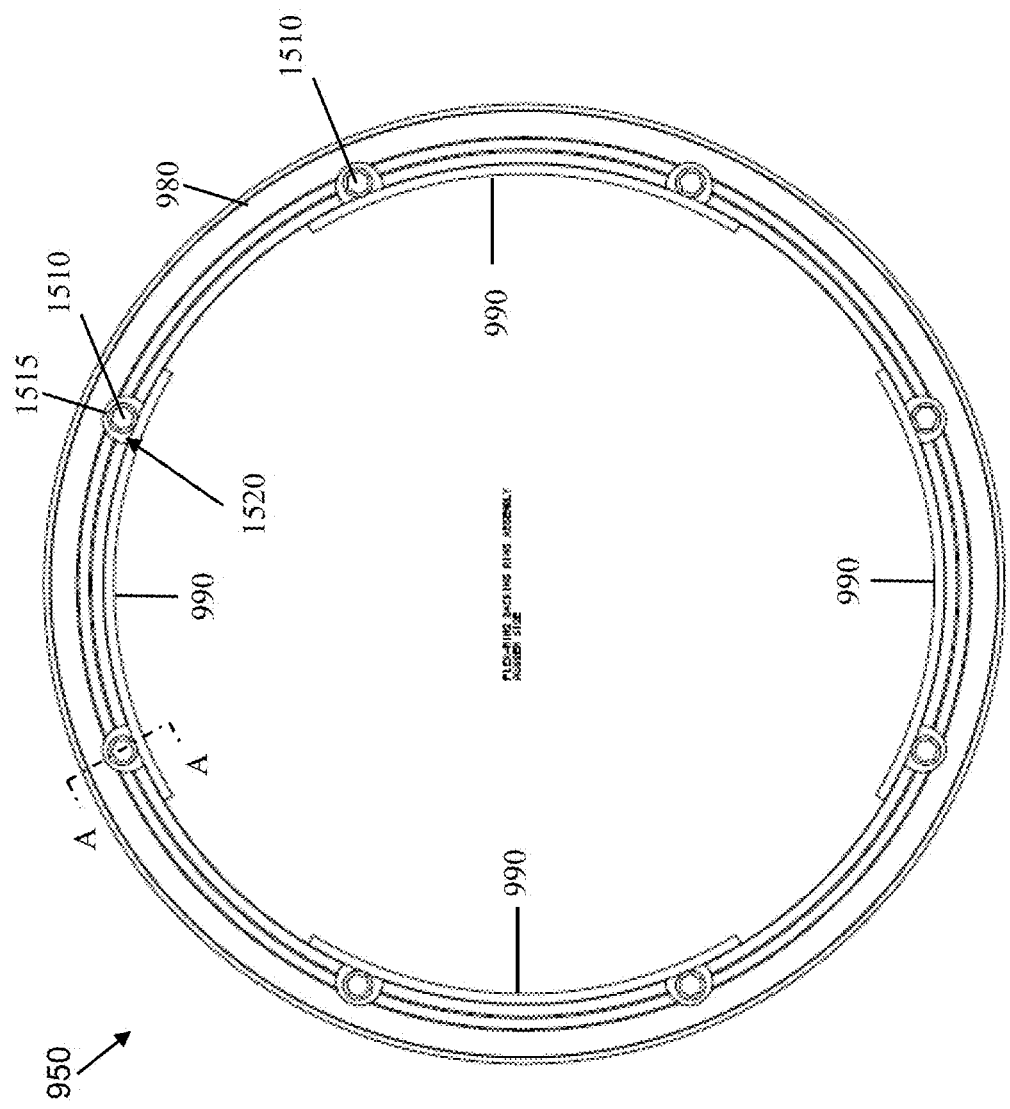
FIG. 15 is a back view of a rubber ring side of a dual component restraining ring, in accordance with the another embodiment of the disclosed subject matter.

FIG. 15 is a back view of a rubber ring side of a dual component restraining ring, in accordance with the another embodiment of the disclosed subject matter. In FIG. 15, the restraining ring 950 includes a substantially annular rubber ring 980 to which multiple, curved iron segments 990 are attached at equally spaced apart locations using at least two fasteners 1510 per iron segment 990. For example, this can include, but is not limited to, either a bolt 1510, a washer 1515 and a pre-threaded opening combination; a self-tapping screw 1510, washer 1515 and an unthreaded opening combination, and/or a self-tapping cap screw 1510 with a built in washer portion and an unthreaded opening combination. In the 16" embodiment shown in FIG. 15, there are four (4) iron segments 990 and each one has an inside arc of about 62 degrees and an arc between the two (2) openings of about 45 degrees. As a result, in the 16" embodiment, there can be between 2½" to 3" of space between each iron segment 990. As larger sizes of the restraining ring 950 are produced, not only can the number of iron segments 990 needed for the rubber ring 980 increase, so can their size, which can also mean more fasteners 1510 are needed for each iron segment 990, for example, three (3) or more. As seen in FIG. 15, multiple substantially cylindrical fastener recesses 1520 are shown spaced about equal distances apart around the rubber ring 980. Although not seen here (but see FIG. 17 for a cross-sectional view of the restraining ring 950 along Line A-A for the design of the openings) in FIG. 15, there are openings passing through the rubber ring 980 as well as matching openings passing through the iron segments 990.

Figure 16:
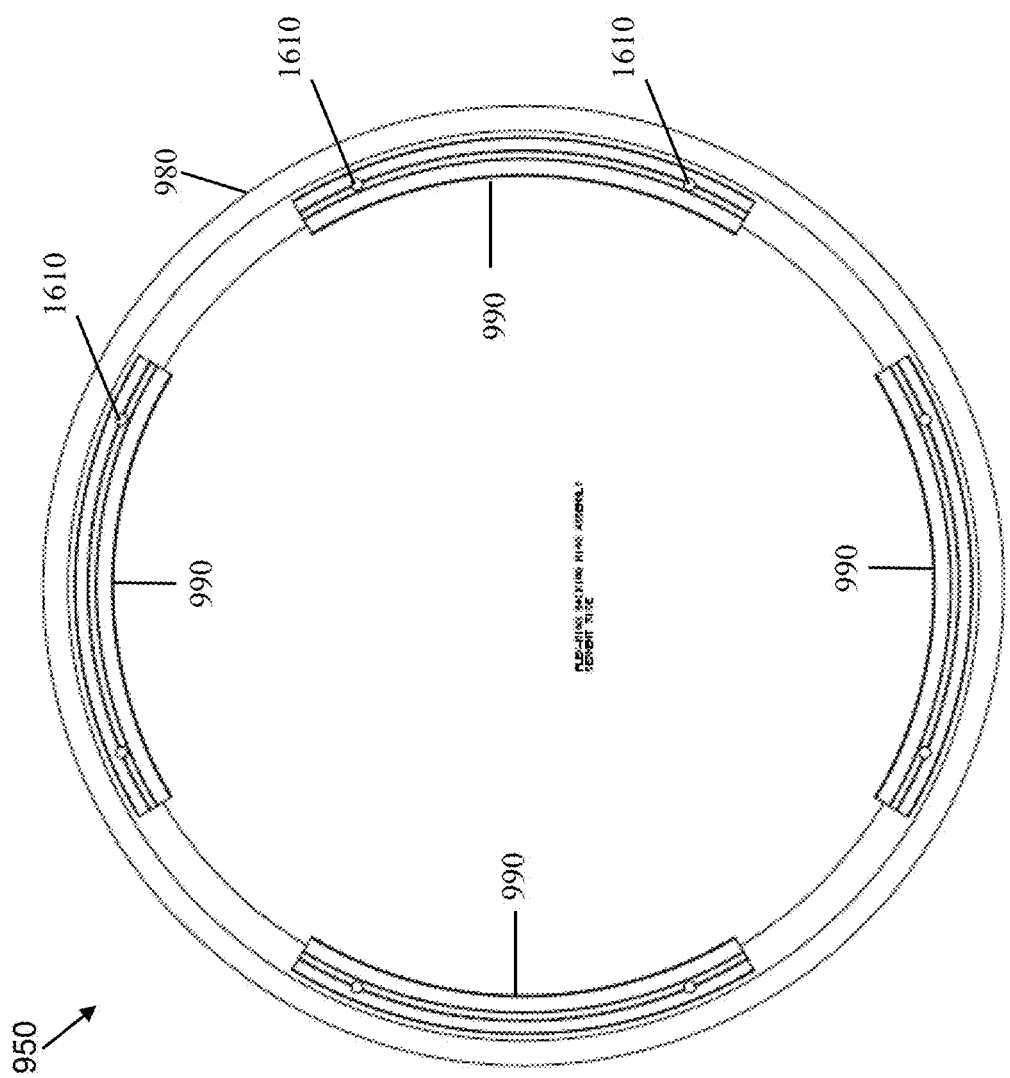
FIG. 16 is a front view of an iron segment side of a dual component restraining ring, in accordance with the another embodiment of the disclosed subject matter.

FIG. 16 is a front view of an iron segment side of a dual component restraining ring, in accordance with the another embodiment of the disclosed subject matter. In FIG. 16, two (2) openings 1610 are seen on each iron segment 990 and that align with the openings on the rubber ring 980 through which the fasteners 1510 threadingly engage the openings 1610 in the iron segments 990. For example, this can include, but is not limited to, either the bolt 1510, washer 1515 and a pre-threaded opening combination; a self-tapping screw 1510, washer 1515 and an unthreaded opening combination, and/or a self-tapping cap screw 1510 with a built in washer portion and an unthreaded opening combination. The bolts are tightened down so there is just a slight swell of rubber under the washer, so that no rubber protrudes inside the opening 1610 of any iron segment 990. Optionally, a thread locking adhesive can be used to help lock the bolt threads into the opening 1610 threads.

Figure 17:
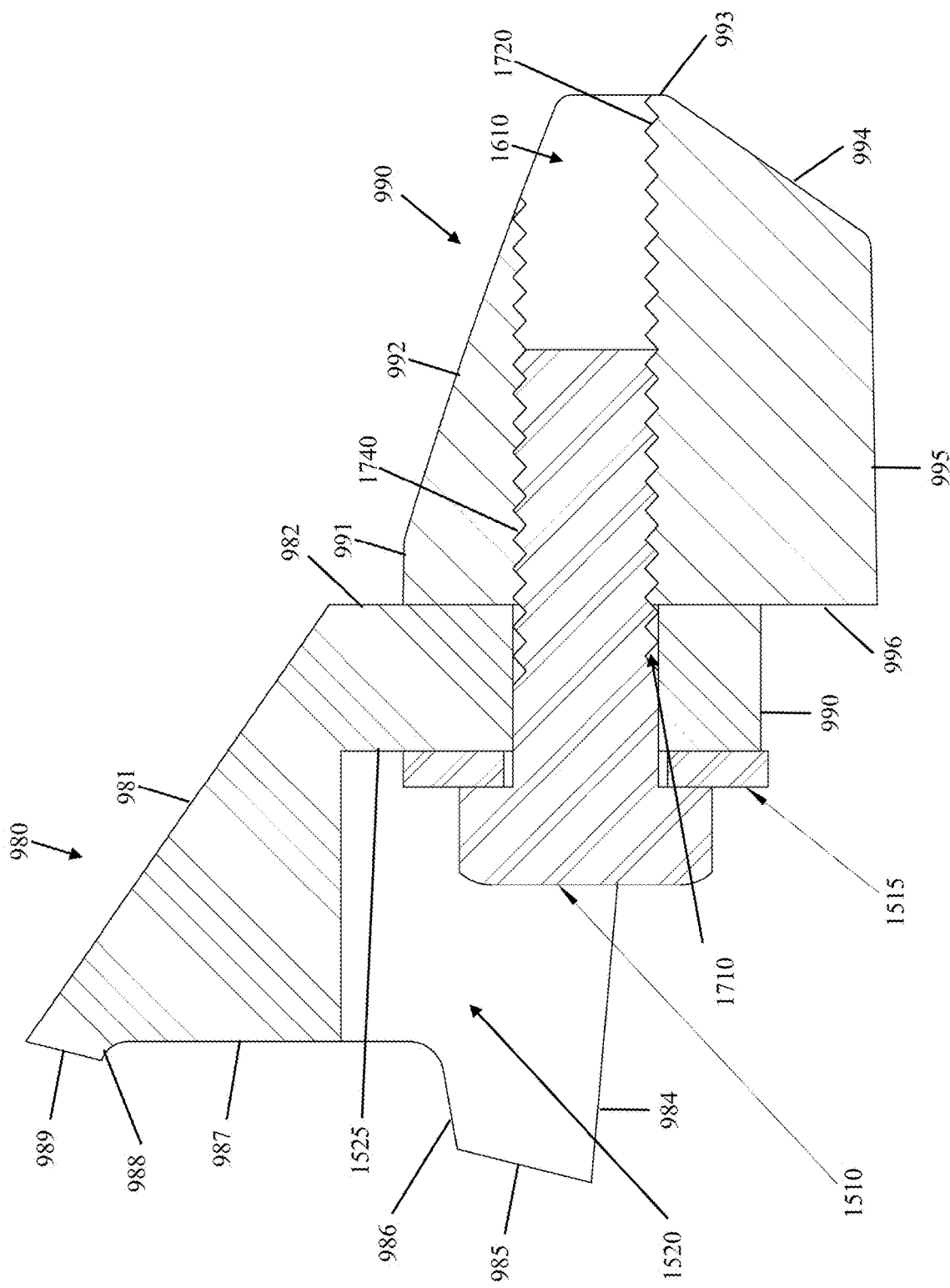
FIG. 17 is a partial, cross-sectional view showing a close-up, cross-sectional view of the uncompressed gasket of FIG. 15, in accordance with the another embodiment of the disclosed subject matter.

FIG. 17 is a partial, cross-sectional view showing a close-up, cross-sectional view of the uncompressed restraining ring 950 of FIG. 15 along line A-A, in accordance with the another embodiment of the disclosed subject matter. In FIG. 17, a bolt opening 1710 is defined in a front wall 982 of and passes through the rubber ring 980 to a back opening defined in a bolt recess back wall 1525 that is configured to receive the bolt 1510 with the washer 1515 or the self-tapping screw 1510 and the washer 1515. As shown, the rubber ring portion front wall 982 abuts a back wall 996 of the iron segment 990. As seen in FIG. 17, the front wall 996 defines the threaded channel 1610, which is shown in FIG. 17 with reciprocal threads 1720 to accept and engage threads 1740 on bolt 1510. As seen in the embodiment in FIG. 17, the threaded channel 1610 extends completely through the iron segment 990, however, in other embodiments, for example, but not limited to, larger diameter restraining rings 950 for use in larger diameter pipe, the channel 1610 does not need to extend completely through the iron segment 990. A bottom edge of the iron segment back wall 996 connects to a back edge of a bottom wall 995 of the iron segment 990 that extends forwardly and inwardly away from the iron segment back wall 996 at about a 1 degree angle. A front edge of the iron segment bottom wall 995 connects to a bottom edge of a forwardly and outwardly angled lower wall 994, which, at a top edge connects to a bottom edge of an outwardly extending middle wall 993 of the iron segment 990. The outwardly extending middle wall 993 is substantially perpendicular to the bottom wall 995 and substantially parallel to the back wall 996 and, at a top edge, the middle wall 993 connects to a front edge of an outwardly and rearwardly extending top front wall 992. A top edge of the top front wall 992 connects to a front edge of a rearwardly and about a 1 degree outwardly extending top wall 991 and a back edge of the rearwardly extending top wall 991 connects to a top edge of the back wall 996.

In FIG. 17, the rubber ring 980 can include an angled top wall 981 that slopes from a high point on the back side of the rubber ring 980 to a low point where a front edge of the angled top wall 981 it connects with a top edge of the inwardly extending rubber portion front wall 982. A bottom edge of the inwardly extending rubber portion front wall 982 connects to a front edge of a rearwardly and substantially perpendicularly extending bottom wall 983. A back edge of the rearwardly and substantially perpendicularly extending front bottom wall section 983 connects to a bottom edge of the bolt recess back wall 1525 as well as a bottom edge of the back bottom wall section 984, although the bottom back edge is not seen due to the bolt 1510, the washer 1515 and the back wall bolt recess 1525. The back bottom wall section 984 extends rearwardly and slightly outwardly away from the bolt recess back wall 1525. A back edge of the back bottom wall section 984 connects with a bottom edge of an outwardly and slightly forwardly angled lower back wall section 985, which, at a top edge connects to a back edge of a slightly forwardly and outwardly angled lower, middle wall portion 986. A front edge of the slightly forwardly and outwardly angled lower, middle wall portion 986 curves upwardly to and merges with a bottom edge of an outwardly extending middle back wall section 987. A top portion of the outwardly extending middle back wall section 987 curves slightly rearwardly to connect to a front edge of a short, rearwardly and inwardly extending lip 988, which at a back edge connects to a top edge to a bottom edge of an outwardly and forwardly extending a top back wall section 989, and a top edge of the top back wall section 989 connects to a back edge of the angled top wall 981.

In general, the bolts 1510 used to fasten the iron segments 990 to the rubber ring 980 can include a unified standard hex head bolt or a cap screw or a slotted large hex head machine screws ¼"×⅝" long, zinc plated, low carbon steel ASTM A307 or equal, although, a ¼"×¾" bolt may be substituted. With the bolt as the fastener, generally there are at least two holes, depending on the O.D. of the restraining ring 950, need to be drilled and tapped with reciprocal threads to accept and engage the bolt threads in each iron segment 990. Alternatively, a case hardened ⁵⁄₁₆-18"×⅝" hex washer-head self-tapping screw with swageform threads of low carbon steel. If the washer 1515 is needed, for example with the standard bolt as the fastener, it can include, for example, but not limited to, a ¾" diameter SAE washer with a thickness of ¹⁄₁₆" and ⅝" O.D. zinc plated, carbon steel. The iron segments 990 can be bolted to the rubber ring 980 using any of the fasteners described above along with a locking adhesive that can be used in the bolt/screw and thread locations to prevent the loosening of the mounting bolt/screw locations.

FIG. 18 is a flow chart of a method of assembling a bell and spigot pipe joint with the spigot end of the earthquake resistant push-on type pipe joint fitting inserted into a bell end of a second pipe and the bell end of the earthquake resistant push-on type pipe joint fitting inserted around a spigot end of the first pipe of FIG. 9 and the pipe joint including an annular snap ring, an annular iron segment and rubber dual-component restraining ring and annular rubber gaskets, in accordance with the another embodiment of the disclosed subject matter.

In FIG. 18, a method 1800 of assembling a bell and spigot pipe joint with the spigot end of the earthquake resistant push-on type pipe joint fitting starts 1810 and then a first gasket is inserted 1815 into a gasket socket around an inner circumference of a bell end of a first pipe and then a restraining ring is inserted 1820 into a first pipe front socket around an inner circumference of and adjacent an inwardly depending end flange of the bell end of the first pipe. The method includes inserting 1825 a spigot end of a pipe fitting having an weld bead affixed around an outside circumference of the spigot end of the pipe fitting into the bell end of the first pipe to position a distal portion of the spigot end of the pipe fitting in sealing contact with an inner circumference of the first gasket and top surfaces of the retaining ring in contact with the inwardly depending end flange of the bell end of the first pipe and bottom surfaces of the retaining ring in contact with the weld bead. The method further includes inserting 1830 a second gasket into a gasket socket around an inner circumference of a bell end of the pipe fitting, and inserting 1835 a snap ring around an outer circumference of a spigot end of a second pipe. The method then includes inserting 1840 the spigot end of the second pipe having an annular fitting ring affixed around an outside circumference of the spigot end of the second pipe into the bell end of the pipe fitting to position a distal portion of the spigot end of the second pipe in sealing contact with an inner circumference of the second gasket and inserting 1845 the snap ring into an extended pipe socket around an inner circumference of and adjacent an inwardly depending end flange of the bell end of the pipe fitting. The method also includes determining 1850 whether more pipe joints are to be assembled and, if more are to be made, returning to inserting step 1815 and, if no more pipe joints are to be assembled, then the method ends 1855.

In an embodiment of the disclosed subject matter, an earthquake resistant pipe joint assembly includes a first pipe including a first pipe bell end with an interiorly extending axial flange formed around an inner surface of an end of the first pipe bell end, a first pipe socket/groove formed in and around the inner surface and immediately adjacent to and extending rearwardly away from the axial flange to an inwardly extending first pipe radial protrusion, which is adjacent a first pipe gasket socket that is formed rearwardly of the inwardly extending radial protrusion and in a front section of a first pipe back groove. The earthquake resistant pipe joint assembly also includes a second pipe including a second pipe spigot end with an annular second pipe ring extending around an outer circumference of the second pipe spigot end. The earthquake resistant pipe joint assembly further includes a pipe fitting including a pipe fitting bell end with an interiorly extending axial flange formed around an inner surface of an end of the pipe fitting bell end, an extended pipe fitting socket/groove formed in and extending around the inner surface and adjacent to the flange, a back side of the pipe fitting socket/groove extending inwardly from a bottom of the extended pipe fitting socket/groove to an inwardly extending pipe fitting radial protrusion, which is adjacent a pipe fitting gasket socket that is formed rearwardly of the inwardly extending pipe fitting radial protrusion and in a front section of an extended back groove of the pipe fitting, the pipe fitting also including a pipe fitting spigot end with an annular pipe fitting ring extending around an outer circumference of the pipe fitting spigot end. The earthquake resistant pipe joint assembly still further includes a first annular gasket positioned in the first pipe gasket socket; a first annular snap ring positioned in the first pipe socket/groove against the first pipe interiorly extending axial flange; a second annular gasket positioned in the pipe fitting gasket socket; a second annular snap ring positioned in the pipe fitting socket/groove against the pipe fitting interiorly extending axial flange. The earthquake resistant pipe joint assembly still further includes the pipe fitting spigot end being positioned in the first pipe bell end so a pipe fitting spigot end outer circumference section is in sealing contact with an inner circumference of the first gasket and a first snap ring wedging surface being in sealing contact with a pipe fitting ring wedging surface, and the second pipe spigot end being positioned in the pipe fitting bell end so a second pipe spigot end outer circumference section is in sealing contact with an inner circumference of the second gasket.

In an embodiment of the disclosed subject matter, an earthquake resistant pipe joint assembly includes a first pipe including a first pipe bell end with an interiorly extending axial flange formed around an inner surface of an end of the first pipe bell end, a first pipe socket/groove formed in and around the inner surface and immediately adjacent to and extending rearwardly away from the axial flange to an inwardly extending first pipe radial protrusion, which is adjacent a first pipe gasket socket that is formed rearwardly of the inwardly extending radial protrusion and in a front section of a first pipe back groove. The earthquake resistant pipe joint assembly also includes a second pipe with a second pipe spigot end with an annular second pipe ring extending around an outer circumference of the second pipe spigot end. The earthquake resistant pipe joint assembly further includes a pipe fitting including a pipe fitting bell end with an interiorly extending axial flange formed around an inner surface of an end of the pipe fitting bell end, an extended pipe fitting socket/groove formed in and extending around the inner surface and adjacent to the flange, a back side of the pipe fitting socket/groove extending inwardly from a bottom of the extended pipe fitting socket/groove to an inwardly extending pipe fitting radial protrusion, which is adjacent a pipe fitting gasket socket that is formed rearwardly of the inwardly extending pipe fitting radial protrusion and in a front section of an extended back groove of the pipe fitting, the pipe fitting also including a pipe fitting spigot end with an annular pipe fitting weld bead extending around an outer circumference of the pipe fitting spigot end. The earthquake resistant pipe joint assembly still further includes: a first annular gasket positioned in the first pipe gasket socket; a first annular restraining ring positioned in the first pipe socket/groove against the first pipe interiorly extending axial flange; a second annular gasket positioned in the pipe fitting gasket socket; and a second annular snap ring positioned in the pipe fitting socket/groove against the pipe fitting interiorly extending axial flange. The earthquake resistant pipe joint assembly still further includes the pipe fitting spigot end being positioned in the first pipe bell end so a pipe fitting spigot end outer circumference section is in sealing contact with an inner circumference of the first gasket and the first annual restraining ring being in contact with the pipe fitting weld bead, and the second pipe spigot end being positioned in the pipe fitting bell end so a second pipe spigot end outer circumference section is in sealing contact with an inner circumference of the second gasket.

In an embodiment of the disclosed subject matter, a pipe joint includes a first pipe including a first pipe bell end with an interiorly extending axial flange formed around an inner surface of an end of the first pipe bell end, the interiorly extending flange having a substantially square outer edge and a substantially square inner edge and a flange end surface tapering outwardly from the inner edge to the outer edge with a first pipe inner flange wall extending outwardly from the inner edge and toward and connecting with a first side of a first pipe socket/groove formed in and extending around the inner surface and adjacent to the flange, a second side of the first pipe socket/groove extending inwardly from a bottom of the first pipe socket/groove to a front angled corner of a radial protrusion, a flat inner surface of the radial protrusion extends axially rearwardly away from the front angled corner of a first pipe radial protrusion toward a back edge of the first pipe radial protrusion and a back wall extends substantially perpendicularly outwardly from the back edge to a front corner of a first pipe gasket socket. The pipe joint also includes a pipe fitting including a pipe fitting bell end with an interiorly extending axial flange formed around an inner surface of an end of the pipe fitting bell end, the interiorly extending flange having a substantially square outer edge and a substantially square inner edge and a flange end surface tapering outwardly from the inner edge to the outer edge with a pipe fitting inner flange wall extending outwardly from the inner edge and toward and connecting with a first side of a pipe fitting socket/groove formed in and extending around the inner surface and adjacent to the flange, a second side of the pipe fitting socket/groove extending inwardly from a bottom of the pipe fitting socket/groove to an front angled corner of a radial protrusion, a flat inner surface of the radial protrusion extends axially rearwardly away from the front angled corner of a pipe fitting radial protrusion toward a back edge of the pipe fitting radial protrusion and a back wall extends substantially perpendicularly outwardly from the back edge to a front corner of a pipe fitting gasket socket, the pipe fitting also including a pipe fitting spigot end with an annular pipe fitting ring extending around an outer circumference of the pipe fitting spigot end. The pipe joint further includes a second pipe including a second pipe spigot end with an annular second pipe ring extending around an outer circumference of the second pipe spigot end; a first annular gasket positioned in the first pipe gasket socket; a first annular snap ring positioned in the first pipe socket/groove against the first pipe inner flange wall; a second annular gasket positioned in the pipe fitting gasket socket; and a second annular snap ring positioned in the pipe fitting socket/groove against the pipe fitting inner flange wall. The pipe joint still further includes the pipe fitting spigot end being positioned in the first pipe bell end so a pipe fitting spigot end outer circumference section is in sealing contact with an inner circumference of the first gasket and a first snap ring wedging surface being in sealing contact with a pipe fitting ring wedging surface, and the second pipe spigot end being positioned in the pipe fitting bell end so a second pipe spigot end outer circumference section is in sealing contact with an inner circumference of the second gasket.

In an embodiment of the disclosed subject matter, a method includes inserting a first gasket into a gasket socket around an inner circumference of a bell end of a first pipe; and inserting a first snap ring around an outer circumference of a spigot end of a pipe fitting. The method also includes inserting the spigot end of the pipe fitting having an annular fitting ring affixed around an outside circumference of the spigot end of the pipe fitting into the bell end of the first pipe to position a distal portion of the spigot end of the pipe fitting in sealing contact with an inner circumference of the first gasket and a first snap ring wedging surface in sealing contact with a pipe fitting ring wedging surface; and inserting the first snap ring into a pipe socket around an inner circumference of and adjacent an inwardly depending end flange of the bell end of the first pipe. The method further includes inserting a second gasket into a gasket socket around an inner circumference of a bell end of the pipe fitting; inserting a second snap ring around an outer circumference of a spigot end of a second pipe; and inserting the spigot end of the second pipe having an annular fitting ring affixed around an outside circumference of the spigot end of the second pipe into the bell end of the pipe fitting to position a distal portion of the spigot end of the second pipe in sealing contact with an inner circumference of the second gasket. The method still further includes inserting the second snap ring into an extended pipe socket around an inner circumference of and adjacent an inwardly depending end flange of the bell end of the pipe fitting; and determining whether to assemble more bell and spigot pipe joints and, if it is determined there are more to be assembled, the method loops back and returns to the inserting a first gasket into a gasket socket around an inner circumference of a bell end of a first pipe element and the method continues from there and, if it is determined that there are not any more joints to be assembled, the method ends.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. An earthquake resistant pipe joint assembly comprising:
    a first pipe including a first pipe bell end with a first pipe interiorly extending axial flange formed around an inner surface of an end of the first pipe bell end, a first pipe socket/groove formed in and around the inner surface of the end of the first pipe bell end and immediately adjacent to and extending rearwardly away from the first pipe axial flange to an inwardly extending first pipe radial protrusion, which is adjacent a first pipe gasket socket that is formed rearwardly of the inwardly extending radial protrusion and in a front section of a first pipe back groove;
    a second pipe including a second pipe spigot end with an annular second pipe ring extending around an outer circumference of the second pipe spigot end;
    a pipe fitting including a pipe fitting bell end a pipe fitting interiorly extending axial flange formed around an inner surface of an end of the pipe fitting bell end, an extended pipe fitting socket/groove formed in and extending around the inner surface of the end of the pipe fitting bell end and adjacent to the pipe fitting interiorly extending axial flange, a back side of the pipe fitting socket/groove extending inwardly from a bottom of the extended pipe fitting socket/groove to an inwardly extending pipe fitting radial protrusion, which is adjacent a pipe fitting gasket socket that is formed rearwardly of the inwardly extending pipe fitting radial protrusion and in a front section of an extended back groove of the pipe fitting, the pipe fitting also including a pipe fitting spigot end with an annular pipe fitting weld bead extending around an outer circumference of the pipe fitting spigot end;
    a first annular gasket positioned in the first pipe gasket socket;
    a first annular snap ring positioned in the first pipe socket/groove against the first pipe interiorly extending axial flange;
    a second annular gasket positioned in the pipe fitting gasket socket;
    a second annular snap ring positioned in the pipe fitting socket/groove against the pipe fitting interiorly extending axial flange; and
    the pipe fitting spigot end being positioned in the first pipe bell end so a pipe fitting spigot end outer circumference section is in sealing contact with an inner circumference of the first gasket and the first annual snap ring being in contact with the pipe fitting weld bead, and the second pipe spigot end being positioned in the pipe fitting bell end so a second pipe spigot end outer circumference section is in sealing contact with an inner circumference of the second gasket.

2. The earthquake resistant pipe joint assembly of claim 1, wherein the first annular snap ring comprises a first annular rubber ring and a plurality of iron segments affixed to a front side of the annular rubber ring.

3. The earthquake resistant pipe joint assembly of claim 2, wherein the first annular rubber ring includes a plurality of spaced apart openings with each extending from a back side through and out a front side of the rubber ring and configured to receive a fastener.

4. The earthquake resistant pipe joint assembly of claim 3, wherein each iron segment includes at least two spaced apart openings with each opening extending from a back side and through at least part of and toward a front side of the iron segment and each opening configured to receive a fastener to connect the iron segment to a back side of the annular rubber ring.

5. The earthquake resistant pipe joint assembly of claim 1, wherein the annular second pipe ring is positioned between a front end and a back end of the extended pipe fitting socket/groove.

6. The earthquake resistant pipe joint assembly of claim 1, wherein the joint has a total longitudinal range of motion of about 4.8 inches.

7. The earthquake resistant pipe joint assembly of claim 1, wherein the joint has a total angle of deflection of up to 8 degrees.

8. The earthquake resistant pipe joint assembly of claim 5, wherein the joint between the spigot end of the second pipe and the bell end of the pipe fitting has an angle of deflection of up to 3 degrees.

9. The earthquake resistant pipe joint assembly of claim 1, wherein the annular pipe fitting ring is a machined element of the pipe fitting ring.

10. The earthquake resistant pipe joint assembly of claim 1, wherein the annular second pipe ring is welded to the second pipe.

11. A pipe joint comprising:
    an cylindrical pipe fitting including a bell end with an interiorly extending axial flange formed around an inner surface of an end of the bell end, the interiorly extending axial flange having a substantially square outer edge and a substantially square inner edge and a flange end surface tapering outwardly from the inner edge to the outer edge with an inner flange wall extending outwardly from the inner edge and toward and connecting with a first side of an extended socket/groove formed in and extending around the inner surface and adjacent to the interiorly extending axial flange, a second side of the extended socket/groove extending inwardly from a bottom of the socket/groove to front angled corner of a radial protrusion, the radial protrusion extending inwardly to a height greater than a height of the interiorly extending axial flange, a flat inner surface of the radial protrusion extending axially rearwardly away from the front angled corner of the radial protrusion toward a back edge of the radial protrusion and a back wall of the radial protrusion extending substantially perpendicularly outwardly from the back edge of the radial protrusion to a front corner of a gasket socket, the pipe fitting also including a spigot end with an annular weld bead extending around an outer circumference of the pipe fitting spigot end.

* * * * *